(12) United States Patent
Anderson et al.

(10) Patent No.: US 9,845,039 B2
(45) Date of Patent: Dec. 19, 2017

(54) SYSTEM AND METHOD OF AUTOMATICALLY OPERATING A HOIST SYSTEM FOR A MACHINE

(71) Applicant: Caterpillar Inc., Peoria, IL (US)

(72) Inventors: Ryan Anderson, Germantown Hills, IL (US); Timothy Schwartz, Metamora, IL (US); Joel Skalet, Chillicothe, IL (US); Rodney Menold, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 78 days.

(21) Appl. No.: 14/853,346

(22) Filed: Sep. 14, 2015

(65) Prior Publication Data

US 2017/0072825 A1    Mar. 16, 2017

(51) Int. Cl.
| | | |
|---|---|---|
| *B60R 22/00* | (2006.01) | |
| *E05F 15/00* | (2015.01) | |
| *G05D 1/00* | (2006.01) | |
| *G06F 7/00* | (2006.01) | |
| *G06F 17/00* | (2006.01) | |
| *G06F 7/70* | (2006.01) | |
| *B60P 1/16* | (2006.01) | |
| *B60W 30/18* | (2012.01) | |

(Continued)

(52) U.S. Cl.
CPC ............ *B60P 1/16* (2013.01); *B60P 1/045* (2013.01); *B60P 1/162* (2013.01); *B60W 10/06* (2013.01); *B60W 10/10* (2013.01); *B60W 10/18* (2013.01); *B60W 30/18054* (2013.01); *B60W 2510/0642* (2013.01); *B60W 2510/101* (2013.01); *B60W 2510/186* (2013.01); *B60W 2710/065* (2013.01); *B60W 2710/1005* (2013.01); *B60W 2710/188* (2013.01)

(58) Field of Classification Search
CPC . B60P 1/045; B60P 1/16; B60P 1/162; B60W 10/06; B60W 10/10; B60W 10/18; B60W 2510/0642; B60W 2510/101; B60W 2510/186; B60W 2710/065; B60W 2710/1005; B60W 2710/188; B60W 30/18054
USPC .......................................................... 701/48
See application file for complete search history.

(56) References Cited

U.S. PATENT DOCUMENTS

| | | |
|---|---|---|
| 2,931,305 A | 4/1960 | Stratton |
| 3,021,177 A | 2/1962 | Gresko |
| (Continued) | | |

FOREIGN PATENT DOCUMENTS

| | | |
|---|---|---|
| DE | 19928249 | 12/2000 |

*Primary Examiner* — Harry Oh
(74) *Attorney, Agent, or Firm* — James S. Bennin

(57) ABSTRACT

A method for implementing and canceling an automatic operation of a body of a machine includes receiving a selection of an automatic setting according to a first operation of a hoist mode actuator, determining an activation state of the automatic setting, causing an automatic operation of an engine of the machine to adjust an idle level of the engine and an automatic operation of a hoist system to move the body in a first direction to a first position. The method includes canceling the automatic operation of the engine and the automatic operation of the hoist system and controlling the idle level of the engine according to operations of a throttle, the hoist system to move the body according to the idle level of the engine and respective directions of the second operation the hoist mode actuator and subsequent operations of the hoist mode actuator.

20 Claims, 12 Drawing Sheets

(51) Int. Cl.
*B60W 10/06* (2006.01)
*B60W 10/10* (2012.01)
*B60W 10/18* (2012.01)
*B60P 1/04* (2006.01)

(56) References Cited

U.S. PATENT DOCUMENTS

| | | | |
|---|---|---|---|
| 3,695,710 | A | 10/1972 | Cresci et al. |
| 3,966,254 | A | 6/1976 | Guhl et al. |
| 4,442,915 | A | 4/1984 | Steel |
| 5,588,712 | A | 12/1996 | Brooks |
| 6,113,193 | A * | 9/2000 | Kunzeman ............ B60P 1/283 123/357 |
| 7,281,602 | B2 | 10/2007 | Svensson et al. |
| 8,267,480 | B2 * | 9/2012 | Kvist .................... B60P 1/283 298/19 R |
| 2008/0133093 | A1 * | 6/2008 | Stanek .................... E02F 9/20 701/50 |
| 2010/0094492 | A1 * | 4/2010 | Filla ...................... B60K 6/442 701/22 |
| 2014/0222285 | A1 | 8/2014 | Love et al. |
| 2015/0004574 | A1 * | 1/2015 | Bomer .................... G09B 9/04 434/219 |
| 2015/0159613 | A1 * | 6/2015 | Jensen ................ B60W 10/02 701/68 |
| 2016/0003171 | A1 * | 1/2016 | Ge ....................... E02F 9/2246 701/102 |

\* cited by examiner

SYSTEM AND METHOD OF AUTOMATICALLY OPERATING A HOIST SYSTEM FOR A MACHINE

TECHNICAL FIELD

The present disclosure relates generally to a hoist system for controlling movement of a body relative to a machine frame and a system for automatically operating the hoist system to move the body.

BACKGROUND

Load carrying machines, including trucks, wheel loaders and the like, are commonly employed during construction and excavation for transporting loads from one point to another. These load carrying machines may comprise a body for holding material, often known as a dump body, which can be raised relative to a chassis of a machine and tipped about a pivot point to empty any material held therein. The body position may be controlled by one or more actuators, commonly hydraulic, which may operate a hoist device which may move the body between a fully lowered position and a fully raised position. In the fully lowered position, the body may rest upon the chassis, and in the fully raised position, the body may be positioned at a maximum angle about the pivot point and relative to the chassis.

During a complete raise and lower hoist cycle of the body, an operator may have to execute several actions according to a given hoist procedure for the hoist device. This may include, but is not limited to operating a brake of the machine, changing a transmission range of a transmission, and operating a device(s) that controls a movement of the body. As a result, completing the actions of a given hoist procedure may contribute to lower operational efficiency and greater operator fatigue throughout a work day.

U.S. Pat. No. 7,281,602 ("the '602 patent"), entitled "Method and Device for Controlling Specific Functions Within a Load-carrying Vehicle Under Dumping and/or Loading the Load-carrying Platform of the Vehicle," is directed toward a method and device for controlling specific functions of a load-carrying vehicle when dumping and/or loading a load-carrying platform. The device described in the '602 patent includes a maneuvering organ arranged in a cabin of the load-carrying vehicle for hand maneuvering by a driver. The maneuvering organ may activate a brake or select a neutral position in a gearbox when the maneuvering organ is activated.

However, there is a need for an improved system that reduces a number of actions that must be completed by a driver or operator of a vehicle attempting to operate a body of the vehicle which can hold and distribute material. Further, there is a need for an improved system that gives control of different components and/or systems of the vehicle to the driver or operator during an automatic raising or lowering of the body, in response to specific inputs from the driver or operator and/or detected conditions of operation.

SUMMARY

According to an aspect of the present disclosure a method for implementing and canceling an automatic operation of a body of a machine includes receiving, via one or more processors, a selection of an automatic setting according to a first operation of a hoist mode actuator of the machine, and determining, via the one or more processors, an activation state of the automatic setting. The method further includes causing an automatic operation of an engine of the machine to adjust an idle level of the engine to a first idle level in response to determining the automatic setting is activated, and causing an automatic operation of a hoist system of the body to move the body in a first direction to a first position according to the first idle level of the engine and a direction of the first operation of hoist mode actuator in response to determining the automatic setting is activated. According to another aspect of the present disclosure, the method includes canceling the automatic operation of the engine in response to a second operation of the hoist mode actuator and controlling the idle level of the engine according to operations of a throttle of the machine, and canceling the automatic operation of the hoist system in response to the second operation of the hoist mode actuator and controlling the hoist system to move the body according to the idle level of the engine and respective directions of the second operation the hoist mode actuator and subsequent operations of the hoist mode actuator.

According to an aspect of the present disclosure a method for implementing and canceling an automatic operation of a body of a machine includes receiving, via one or more processors, a selection of an automatic setting according to a first operation of a hoist mode actuator of the machine, and determining, via the one or more processors, an activation state of the automatic setting. The method further includes causing an automatic operation of an engine of the machine to adjust an idle level of the engine to a first idle level in response to determining the automatic setting is activated, and causing an automatic operation of a hoist system of the body to move the body in a first direction to a first position according to the first idle level of the engine and a direction of the first operation of hoist mode actuator in response to determining the automatic setting is activated. According to another aspect of the present disclosure, the method includes canceling the automatic operation of the engine in response to an operation of a throttle of the machine and controlling the idle level of the engine according to the operation throttle and subsequent operations of the throttle, and causing the hoist system to continue to a movement of the body according to the automatic operation of the hoist system.

According to an aspect of the present disclosure, a machine includes a frame, a cab mounted on the frame and configured to accommodate a user, an engine mounted on the frame, a body attached to the frame configured to move relative to the machine between a fully raised position and a fully lowered position, a hoist system configured to transmit a force of the engine to move the body, a hoist mode actuator in the cab configured to actuate the hoist system to move the body, and a controller operatively connected to the hoist mode actuator, the hoist system, and the engine. According to another aspect of the present disclosure, the hoist mode actuator is operated in a first operation and the controller controls an automatic operation of the engine to increase an idle level of the engine and an automatic operation of the hoist system to transmit a force corresponding to the idle level of the engine and move the body in a continuous movement to one of the fully raised position and the fully lowered position. According to another aspect of the present disclosure, the hoist mode actuator is operated in a second operation and the controller cancels the automatic operation of the engine in response to the second operation and the controls the idle level of the engine according to operations of a throttle of the machine, and the controller cancels the automatic operation of the hoist system in response to the second operation and controls the hoist system according the second operation of the hoist mode actuator and subsequent operations of the hoist mode actuator.

DETAILED DESCRIPTION

Aspects of the disclosure will now be described in detail with reference to the drawings, wherein like reference numbers refer to like elements throughout, unless specified otherwise.

It is noted that as used in the specification and the appending claims the singular forms "a," "an," and "the" can include plural references unless the context clearly dictates otherwise.

Unless specified otherwise, the terms "substantial" or "substantially" as used herein mean "considerable in extent," or "largely but not necessarily wholly that which is specified."

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Figure 1:
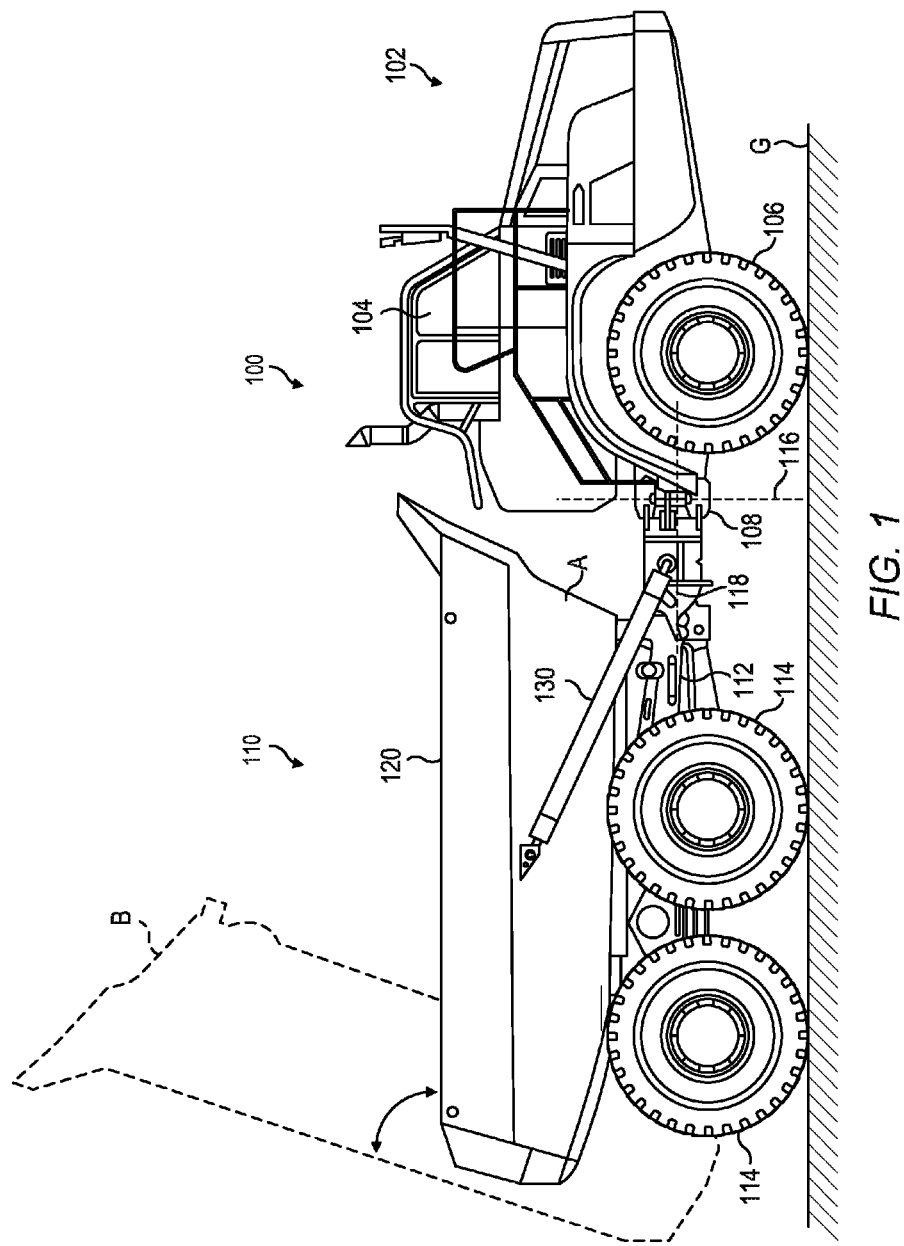
FIG. 1 illustrates a side view of a machine, according to an aspect of the present disclosure.

FIG. 1 illustrates a side view of a machine 100, according to an aspect of the present disclosure. The machine 100 may include a first frame 102, for example a tractor unit, attached to a second frame 110, for example a trailer unit. The first frame 102 may include a cab 104 that may accommodate an operator and house a plurality of controls for operating the machine 100. The plurality of controls may include a steering device, and as described in more detail below, one or more actuators for various components of the machine 100. The machine 100 illustrated in FIG. 1 is an exemplary machine, and aspects of the present disclosure may be implemented in various types of machines including but not limited to articulated trucks with tipping bodies, articulated trucks with ejector mechanisms, articulated wheel loaders, and the like.

The first frame 102 may be supported by a pair of first wheels 106, and attached by a coupling 108 to a chassis 112 of the second frame 110. The coupling 108 may be an articulation joint, and may allow each of the first frame 102 and the second frame 110 to be orientated at a different yaw and/or roll angle relative to the other frame. The chassis 112 may be supported by pairs of second wheels 114 that may, along with the first wheels 106, be in contact with a ground level G, or any other surface on which the machine 100 is operated. The first wheels 106 and the second wheels 114 provide traction devices that propel the machine 100 along the ground level G upon application/transmission of a rotational force thereon. It will be understood that the machine 100 may include other traction devices such as tracks.

The machine 100 may be steered by adjusting the yaw angle of the first frame 102 and the second frame 110 about an axis of articulation 116 utilizing actuators, for example hydraulic cylinders, suitably attached to each of the first frame 102 and the second frame 110 on either side of the coupling 108. The coupling 108 may allow the first frame 102 and the second frame 110 to rotate relative to one another about a roll axis 118.

The second frame 110 may comprise a body 120, such as a dump body, adapted to carry a load. The body 120 may be pivotally attached to a chassis 112 of the second frame 110 at a pivot point. The second frame 110 may further comprise a hoist device 130 which, when actuated, may raise the body 120 from a first body position A (e.g. a fully lowered position or a maximum position in a lowering direction) resting on the chassis 112, and cause body 120 to rotate about the pivot into a second body position B (e.g. a fully raised position or a maximum position in a raising direction) at an angle relative to the chassis 112. As the body 120 rotates into the second body position B, the body 120 may eject some or all materials or a load from within the body 120. The hoist device 130 may be actuated to carry out a reverse operation in which the body 120 is lowered from the second body position B back to the first body position A. The body 120 may be any type of container and may be open at the top, fully enclosed, or partially enclosed.

The hoist device 130 may be connected between the body 120 and the chassis 112, and the machine 100 may include at least one hoist device 130 on each side of the body 120 relative to a longitudinal axis of the machine 100. Alternatively, at least one or more of the hoist device 130 may be provided underneath the body 120 or in another configuration. The hoist device 130 may be any device, hydraulic, electrical, mechanical, or combination thereof, suitable for raising and lowering the body 120. In addition, the machine 100 may include a device for ejecting materials or a load from the body 120. Such an ejector device may include an ejector plate that slides horizontally from one end of an inside of the body 120 towards an opposite end (e.g. an ejection end) to push any materials or other load out of the body 120. A hydraulic actuator or the like may be used to move the ejector plate towards the ejection end of the body 120.

Figure 2:
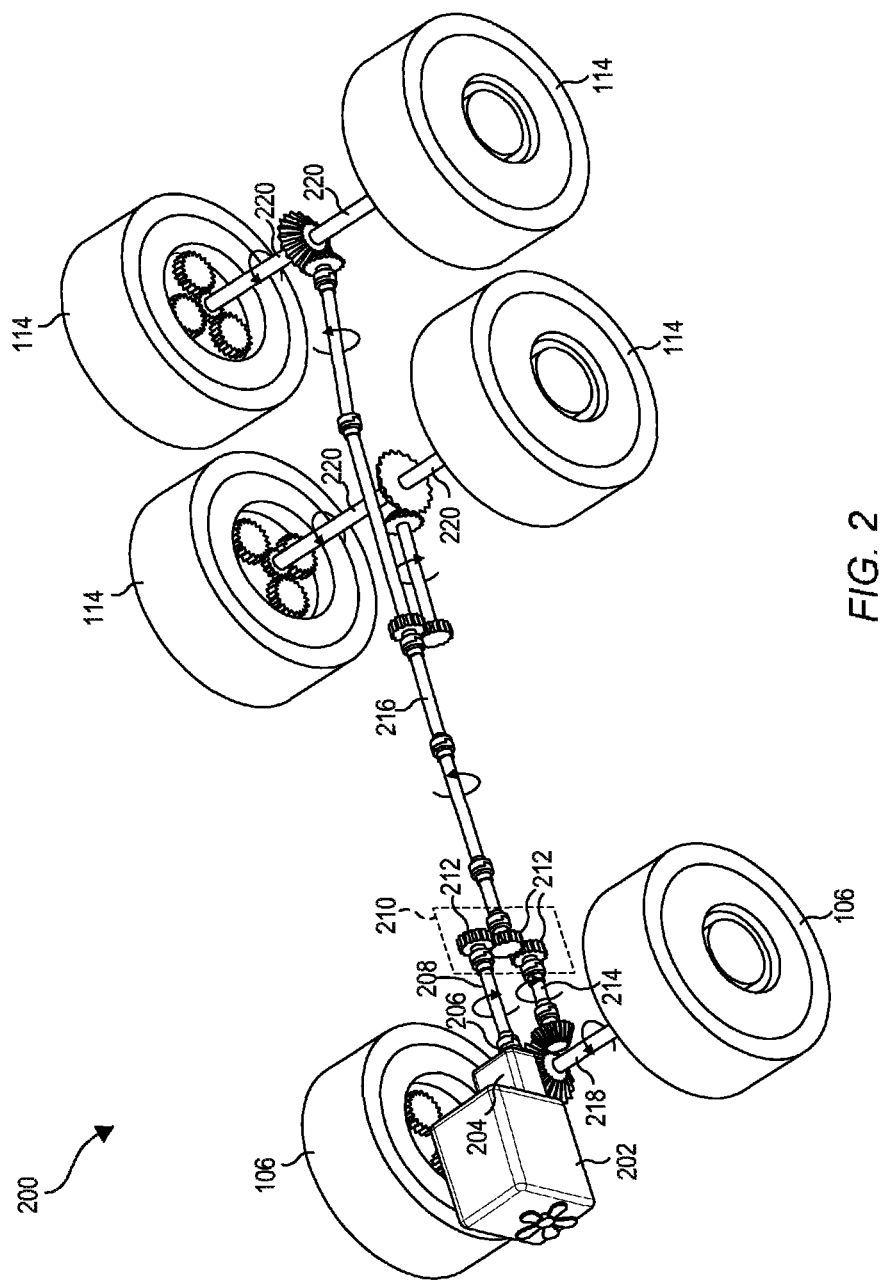
FIG. 2 illustrates a perspective view of a powertrain, according to an aspect of the present disclosure.

FIG. 2 illustrates a perspective view of a powertrain 200, according to an aspect of the present disclosure. As illustrated in FIG. 2, an engine 202 is coupled to a transmission 204, which in turn, is coupled to a torque transmitting arrangement 210 by a coupler 206 and a first transmission shaft 208. The engine 202 and the transmission 204 may be mounted on the first frame 102.

The torque transmitting arrangement 210 includes gearing 212 coupled to the first transmission shaft 208, a first drive shaft 214, and a second drive shaft 216. The gearing 212 may include a plurality of gears and an inter-axle differential as an integral component of the gearing 212. The torque transmitting arrangement 210 may transfer an output of the engine 202, such as a torque output, to the first drive shaft 214 and the second drive shaft 216. The first drive shaft 214 may be connected to a first axle 218 by a mechanism, such as a differential, and may transmit torque corresponding to the output of the engine 202 to the first wheels 106 attached to the first axle 218. The second drive shaft 216 may be connected to second axles 220 by respective mechanisms, such as differentials, and may transmit torque corresponding to the output of the engine 202 to the pairs of second wheels 114 attached to the second axles 220.

The integral inter-axle differential of the gearing 212 may be drivably connected to the coupling 206 and the first transmission shaft 208 to receive and transfer torque to more than one of the plurality of gears of the gearing 212. Each of the first drive shaft 214 and the second drive shaft 216 may be connected to at least one of the plurality of gears of the gearing 212 and may receive a percentage of torque output by the engine 202 for transmission to first axle 218 and the second axle 220. Thus, the inter-axle differential may split a torque transmitted by the first transmission shaft 208 between first axle 218 and the second axle 220.

The gearing 212 may include an inter-axle differential lock that may lock the first axle 218 and the second axle 220 together so the first axle 218 and the second axle 220 rotate together at the same speed. As a result, the first wheels 106 and the second wheels 114 may be driven at the same speed. The inter-axle differential lock may be actuated by a pressurized hydraulic fluid supplied from a differential control valve. The inter-axle differential lock may have a manual mode, in which it is activated by an operator according to an operation of a switch, for example. In addition, the inter-axle differential lock may have an automatic mode, in which it is engaged or disengaged based on operating conditions of the machine 100.

The output of the engine 202 may be transmitted to the first wheels 106 and the second wheels 114 according to a range of an operative engagement between a gear train of the transmission 204 and the first transmission shaft 208. In a neutral transmission range of the transmission 204, the gear train, or a portion of the gear train, may be disconnected from the first transmission shaft 208, for example by a clutch, in such a manner that the output of the engine 202 is not transmitted to the first transmission shaft 208. Other transmission ranges may include one or more drive modes in which the output of the engine 202 is transmitted to the first wheels 106 and/or second wheels 114, such as a forward drive mode which allows a gear ratio of the gear train to change automatically, and a reverse drive mode. As described in more detail below, an appropriate transmission range for the operating of the machine 100 may be obtained based on various inputs.

Figure 3:
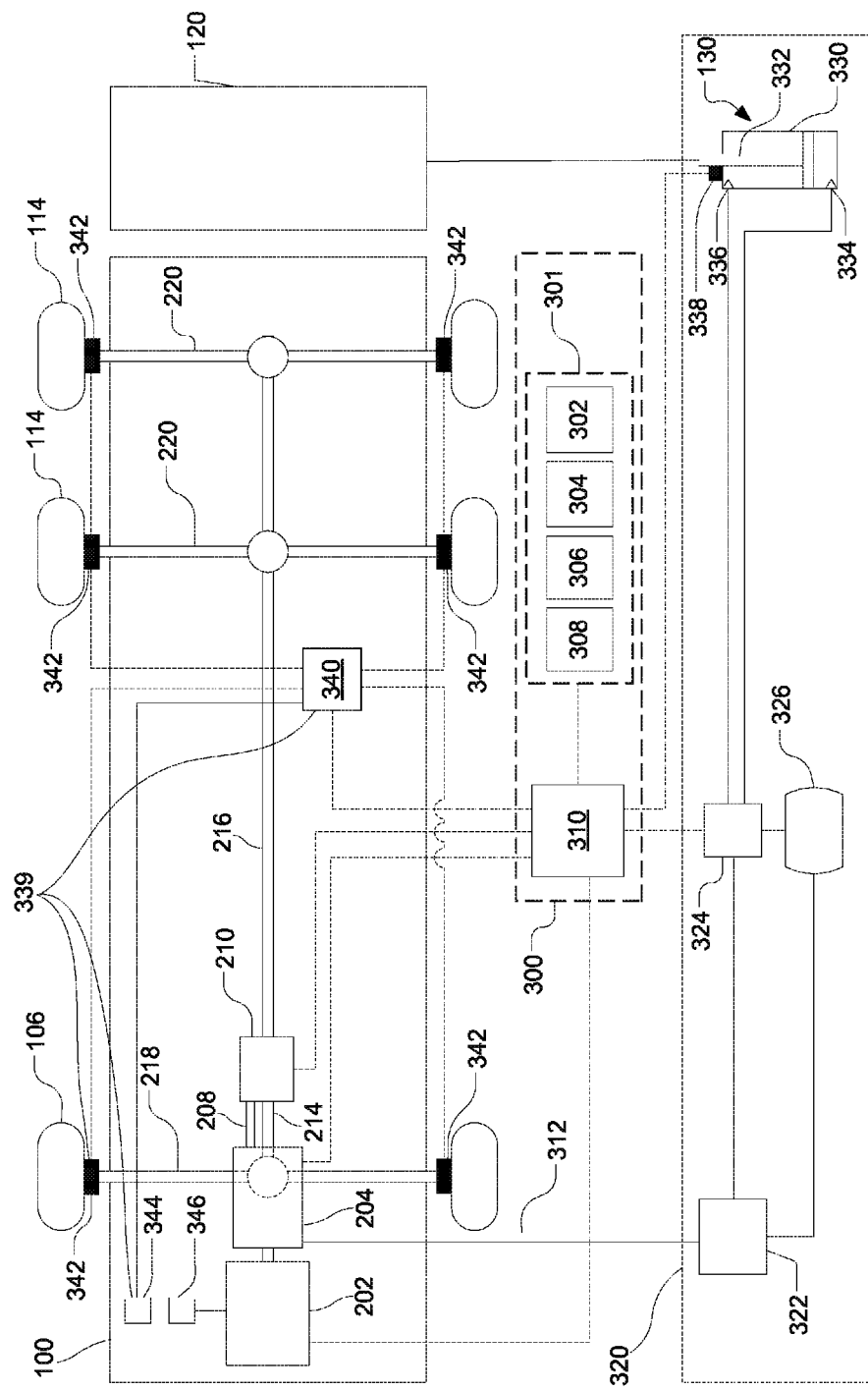
FIG. 3 is a schematic top view of the machine of FIG. 1, including a schematic top view of a control system, according to an aspect of the present disclosure.

FIG. 3 is a schematic top view of the machine of FIG. 1, including a schematic top view of a control system 300, according to an aspect of the present disclosure. The control system 300 includes an actuator system 301 and a first controller 310. The actuator system 301 may include a transmission range actuator 302, a hoist automatic mode actuator 304, a hoist mode actuator 306, and an automatic brake actuator 308. The actuator system 301 may be connected to and communicate with a first controller 310. It will be appreciated that each of the transmission range actuator 302, the hoist automatic mode actuator 304, and the hoist mode actuator 306 may be connected to the first controller 310 independently or through a central communication device, such as bus or network connection.

The hoist system 320 may be a hydraulic system, including at least one hydraulic actuator. Alternatively, the hoist system 320 may be a pneumatic or electrical system, comprising pneumatic or electrical actuators. According to an aspect of the present disclosure, the hoist system may include a pump 322 that is connected to the transmission 204 by a second transmission shaft 312. A valve 324 may be a control valve, and may be used in conjunction with the hoist automatic mode actuator 304 and the hoist mode actuator 306, to control a supply of pressurized fluid to/from the hoist device 130. The hoist device 130 may include actuator cylinders 330 that provide a fixed length of straight-line motion. The actuator cylinders 330 may be positioned on and attached to each side of the body 120. According to an aspect of the present disclosure, each actuator cylinder 330 may house a driven member 332, such as a tight-fitting piston movable within a closed cylinder and attached to a rod that extends from one end of the closed cylinder to provide mechanical output. The driven member 332 may be arranged to apply a directional force to the body 120 during an actuation of the hoist device 130.

Each actuator cylinder 330 may include a first fluid port 334 and a second fluid port 336 for supplying or outputting a working fluid according to a desired direction of movement of the driven member 332, and thus, according to a desired direction of movement of the body 120. The valve 324 may connect the first fluid port 334 and the second fluid port 336 of each actuator cylinder 330 of the hoist device 130 to a working fluid supply, such as the pump 322, or a fluid return, such as the fluid tank 326, according to an actuation and direction of a movement of the body 120. The pump 322 may be driven by the engine 202, via the second transmission shaft 312 and the transmission 204, to supply pressurized working fluid to the actuator cylinders 330 of the hoist device 130.

According to one aspect of the present disclosure, the valve 324 may have a first valve position in which the pump 322 is in fluid communication with the first fluid port 334 and the fluid tank 326 is in fluid communication with the second fluid port 336 of each actuator cylinder 330. The driven member 332 may be driven by the supply of working fluid to the first fluid port 334 to extend out of the actuator cylinder 330 and raise the body 120. As such, the first valve position of the valve 324 may correspond to an actuation of a raising movement of the body 120.

The valve 324 may have a second valve position in which the pump 322 is in fluid communication with the second fluid port 336 and the fluid tank 326 is in fluid communication with the first fluid port 334 of each actuator cylinder 330. The driven member 332 may be driven by the supply of working fluid to the second fluid port 336 to retract into the actuator cylinder 330 and lower the body 120. As such, the second valve position of the valve 324 may correspond to an actuation of a lowering movement of the body 120. Alternatively, it will be appreciated that the hoist device 130 may include additional components, or engage and actuate components of the body 120, such that the extension and retraction of the driven member 332 actuate the lowering and raising movements of the body 120, respectively.

The valve 324 may have a third valve position, in which the hoist device 130 is unpressurised or under a low pressure. Further, both the first fluid port 334 and the second fluid port 336 of each actuator cylinder 330 may be connected to atmospheric pressure, or to a source of low pressure such as the fluid tank 326.

In addition, the valve 324 may have a fourth valve position in which the actuator cylinders 330 remain pressurized, while preventing flow of the working fluid. Accordingly, when the valve is in the fourth valve position, the body 120 may be held in a position between the first position A and the second position B. The position and/or direction of movement of the driven member 332 or other component that moves with a movement of the body 120, and thus the position and/or direction of movement of the body 120, may be detected and communicated to the first controller 310 by a sensor 338, such as a position, motion, or position and motion sensor, according to one aspect of the present disclosure.

As illustrated in FIG. 3, the machine 100 may include a brake system 339 including a second controller 340 and brake devices 342 positioned on each of the first wheels 106 and the second wheels 114. The brake devices 342 may include service brakes for situations in which the machine 100 may be stopped temporarily with the engine 202 still running, such as during loading and dumping of materials by the body 120. The brake devices 342 may be actuated based on several operator inputs.

According to an aspect of the present disclosure, the brake system 339 may include a manual brake actuator 344 of the brake system 339, for example a foot pedal. An operator may apply a continuous force to the manual brake actuator 344 in order to directly actuate the brake devices 342. In the actuated state, the brake devices 342 apply respective brake forces to the first wheels 106 and the second wheels 114, and as a result, the first wheels 106 and the second wheels 114 are prevented from rotating. Upon ending the application of the continuous force (e.g. releasing a foot pedal), the brake devices 342 are operated to change from an actuated state to a normal state permitting the first wheels 106 and the second wheels 114 to rotate and the machine 100 to move. The manual brake actuator 344 may be in operative communication with and operated by control signals from the second controller 340, or in the alternative, the first controller 310, which may operate the second controller 340 to actuate the brake devices 342 according to an input to the manual brake actuator 344.

Another direct actuation of the brake devices 342 may occur in response to an operation of the automatic brake actuator 308. Under certain conditions, for example when the machine 100 is stationary and the transmission 204 is in the neutral state, an operator may perform a one-time operation of the automatic brake actuator 308. The first controller 310 being in communication with the actuator system 301, receives a signal indicating the automatic brake actuator 308 has been operated, and controls the second controller 340 to actuate, and maintain in the actuated state, the brake devices 342. Thus, an operator may end an operation of the manual brake actuator 344 as the first wheels 106 and the second wheels 114 are prevented from rotating by the brake devices 342 being automatically maintained in the actuated state. Accordingly, the operator is assisted in performing a continuous operation of the brake devices 342.

The brake system 339 may also include parking brakes, which are intended for use when the engine 202 is not running and the machine 100 is not being operated. In such situations the machine 100 may be brought to a halt on the ground level G, the parking brakes engaged, and the engine 202 turned off.

The first controller 310 may implement several automatic modes of operation for the engine 202, the transmission 204 with respect to the transmission state, the torque transmitting arrangement 210 with respect to the inter-axle differential lock, the hoist device 130, and the brake system 339. According to one aspect of the present disclosure, if the hoist automatic mode actuator 304 has been operated, an automatic (e.g. assisted) operation of the hoist system 320 and movement of the body 120 may be initiated by the first controller 310 in response to an operation of the hoist mode actuator 306. Thus, operation of the hoist system 320 is controlled by the actuator system 301 and the first controller 310 of the control system 300. To complete the automatic (e.g. assisted) operation of moving the body 120, the first controller 310 may simultaneously and/or sequentially implement several automatic operations of the engine 202, the transmission 204, the hoist device 130, and the brake system 339.

During the automatic operation of the hoist system 320 and movement of the body 120, the control system 300 may modify or cancel the various automatic operations of the engine 202, the transmission 204, the torque transmitting arrangement 210, the hoist system 320, or the brake system 339 in response to various operating conditions and operator inputs. A specific automatic operation of the hoist system 320 may be modified, canceled, or reinitiated in response to changes in certain operational conditions of the machine 100; various operations of, for example, the transmission range actuator 302, the hoist automatic mode actuator 304, the hoist mode actuator 306, and the automatic brake actuator 308; or an operation of a throttle 346 for controlling the output of engine 202. According to one aspect of the present disclosure, in response to various operating conditions and operator inputs occurring during an automatic raising or an automatic lowering operation of the body 120, the hoist system control 309 may implement the exemplary assisted hoist system operation cancel strategies detailed in Table 1.

TABLE 1

Hoist System Operation Cancel Strategies

| | Controlled Aspect | | | |
|---|---|---|---|---|
| Body Raising Body Lowering | Engine Speed | Transmission Range | Automatic Brake Actuation | Hoist System Operation |
| Operator Input/ Operating Condition | Action Taken by Control System | | | |
| Throttle Operation (e.g. Throttle Bump) | Give Operator Control | Maintain in Neutral | Maintain Actuated | 100% Raise 100% Lower |
| Change Transmission Range | Give Operator Control | Give Operator Control | Cancel | Hold 100% Lower |
| Operation of Automatic and Manual Brake Actuators | Maintain Idle Level | Maintain in Neutral | Cancel | 100% Raise 100% Lower |

TABLE 1-continued

Hoist System Operation Cancel Strategies

<table>
<tr><td colspan="5">Controlled Aspect</td></tr>
<tr><td>Body Raising<br>Body Lowering</td><td>Engine<br>Speed</td><td>Transmission<br>Range</td><td>Automatic<br>Brake<br>Actuation</td><td>Hoist System<br>Operation</td></tr>
<tr><td>Change Hoist Mode</td><td>Give<br>Operator<br>Control</td><td>Maintain in<br>Neutral</td><td>Maintain<br>Actuated</td><td>Give<br>Operator<br>Control</td></tr>
<tr><td>Powertrain<br>Non-Responsive</td><td colspan="4">Disable Automatic Operations</td></tr>
<tr><td>Body Stalled at<br>Given Angle/<br>Moving in Wrong<br>Direction<br>Stalled/Body</td><td>Give<br>Operator<br>Control</td><td>Maintain<br>in Neutral</td><td>Maintain<br>Actuated</td><td>Give<br>Operator<br>Control</td></tr>
</table>

As shown in Table 1, an operation of the throttle 346 during the automatic operation of the of the hoist system 320 results in control of the engine 202 being given to an operator. The transmission 204 remains in a neutral transmission range, the brake devices 342 remain actuated, and the body 120 continues to be raised or lowered according to the automatic operation of the hoist system 320 being implemented at the time of the operation of the throttle 346.

Table 1 shows an action taken by the control system 300 when the transmission range actuator 302 is operated during the automatic operation of the of the hoist system 320. Specifically, control of the engine 202, the transmission 204, and the brake devices 342 is returned to an operator, while operation of the hoist system 320 is controlled by the control system 300. If the body 120 was being raised as a result of the automatic operation of the hoist system 320 before the transmission range actuator 302 was operated, the control system 300 will operate the valve 324 to be in the fourth valve position so that the body 120 will be held in position. Otherwise, the control system 300 will maintain the valve 324 in the second valve position and the body 120 will continue to be lowered automatically.

In response to an operation of the manual brake actuator 344 and the automatic brake actuator 308, the control system 300 cancels an automatic operation of the brakes 342 which are then controlled according to the operation of the manual brake actuator 344. However, as shown in Table 1, the control system 300 continues to control the engine 202, the transmission 204, and the hoist system 320. Similarly, where the hoist mode actuator 306 is operated during the automatic operation of the hoist system 320, an operator is permitted to control the system corresponding to the actuator being operated. In particular, as shown in Table 1, the hoist system 320 will operate in response to the operation of the hoist mode actuator 306, while the control system 300 continues to control the engine 202, the transmission 204, and the brakes 342 of the brake system 339.

Table 1 also provides two cancel strategies for situations where it is determined there may be potential issues which cause various components of the machine 100 to operate improperly. For example, if it is determined that the powertrain 200 has malfunctioned, the control system 300 cancels automatic operations and return control to an operator for each of the engine 202, the transmission 204, the brake system 339, and the hoist system 320. Further, in a situation in which it is determined that body 120 has stalled or is moving in the wrong direction during an automatic operation of the hoist system 320, the control system 300 permits the engine 202 and the hoist system 320 to be controlled by an operator.

Figure 4:
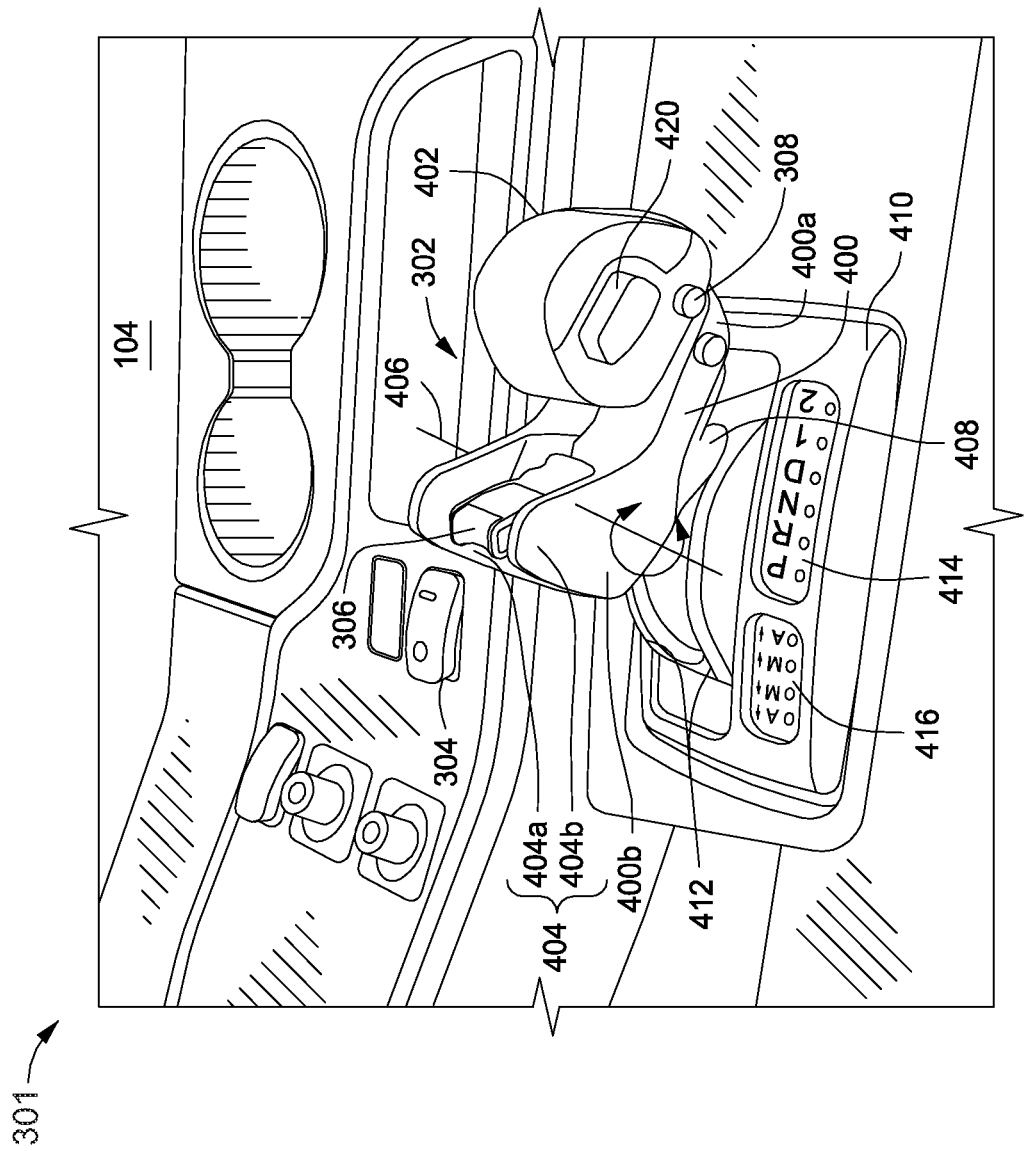
FIG. 4 is an isometric view of the actuator arrangement of FIG. 3, according to an aspect of the present disclosure.

FIG. 4 is an isometric view of the actuator system 301 of FIG. 3, according to an aspect of the present disclosure. As illustrated in FIG. 4, the actuator system 301 is provided within the cab 104. The transmission range actuator 302 includes a base 400 with a first end 400a and a second end 400b opposite to the first end 400a in a direction from a rear to a front of the machine 100. A grip 402 is mounted to or extends monolithically from the first end 400a, and may be used by an operator to grasp the transmission range actuator 302. A first housing 404 may extend from, or may be mounted on, the second end 400b of the base 400. The first housing 404 may include a first wall 404a and a second 404b defining a space there between in which the hoist mode actuator 306 may be positioned. The hoist mode actuator 306 may be attached to the first wall 404a and the second wall 404b, and/or the base 400, such that the hoist mode actuator 306 may pivot about an axis of rotation 406 according to an operation by an operator.

An extension 408 may be attached or formed to extend from a lower portion of the base 400 through a second housing 410 of the transmission range actuator 302 into the machine 100. The extension 408 may extend through a track 412 of the second housing 410 which extends from the rear to the front of the machine 100. A transmission range indicator 414 and a hoist mode indicator 416 may be formed in the second housing 410 adjacent to the extension 408 and the track 412 of the transmission range actuator 302.

The extension 408 may be a rod or other type of shaft connected to the transmission 204 by a mechanical or electromechanical linkage. The extension 408 may move along a path defined by the track 412 to be substantially perpendicular to the axis of rotation 406, according to an operation of a range actuator lock 420 positioned on the grip 402. The range actuator lock 420 may be pressed to move towards the grip 402 in a direction substantially parallel to the axis of rotation 406. An operator may move the range actuator lock 420 inward towards the grip 402 to release the transmission range actuator 302 from a locked position corresponding a respective transmission range. Accordingly, the extension 408, along with the remainder of the transmission range actuator 302 and the hoist mode actuator 306, may move along the path defined by the track 412 from the front towards the rear of the machine 100, and vice versa, when the range actuator lock 420 is moved inward.

Movement of the extension 408 along the track 412 may correspond to a change in the transmission range of the transmission 204, as displayed by the transmission range indicator 414. The transmission range indicator 414 may include devices, such as LEDs or other illumination devices, that are activated according to a position of the transmission range actuator 302 along the track 412, for individual range indicators, P, R, N, D, 2, 1 respectively corresponding to a parked state of the machine 100, and transmission ranges including reverse, neutral, drive (automatic gear changing), drive in a 2nd gear, and drive in first gear.

It will be appreciated that multiple types of mechanisms may be incorporated in the machine 100 to effect a change in the transmission range by the movement of the extension 408. According to an aspect of the disclosure, the extension 408 may be directly connected to the transmission 204 by a mechanical linkage, such that the extension 408 directly moves a component of the transmission 204 and changes the transmission range. According to another aspect of the disclosure, movement of the extension 408 may be recognized by the first controller 310, which may control another mechanism directly connected to the transmission 204 to change the transmission range according to the movement of the extension 408.

The hoist automatic mode actuator 304 is positioned within the cab 104 proximate to the second housing 410 and may include a button as illustrated in FIG. 4. The button may provide a switch that activates selected settings for the hoist mode actuator 306 corresponding to modes of operation for the hoist system 320, such as an auto raise mode and an auto lower mode. The hoist automatic mode actuator 304 may be depressed and lifted, or depressed a series of times according to a hand operation by an operator to activate or terminate an activation of selected settings. It will be appreciated that the hoist automatic mode actuator 304 may be positioned in multiple locations within the cab 104, including on the transmission range actuator 302. Further, it will be appreciated that an operation of the hoist automatic mode actuator 304 may also be voice activated.

As previously discussed, the hoist mode actuator 306 is positioned between the first wall 404a and the second wall 404b of the first housing 404. The hoist mode actuator 306 may be hand operated to pivot about the axis of rotation 406 from a center position, as illustrated in FIG. 4, rearward to a first end position and forward to a second end position. It will be appreciated that an operation of the hoist mode actuator 306 may also be voice activated. The first and second end positions may correspond to first and second settings for the hoist mode actuator 306 for automatically raising and lowering the body 120 respectively, after the hoist automatic mode actuator 304 has been operated.

An operator may operate the hoist mode actuator 306 (e.g. displace via pushing, pressing, scrolling, pivoting, etc.) between the center position and just before the first end position to perform a first manually controlled operation of the hoist system 320 for raising the body 120. Further, an operator may operate the hoist mode actuator 306 (e.g. displace via pushing, pressing, scrolling, pivoting, etc.) between the center position and just before the second end position to perform a second manually controlled operation of the hoist system 320 for lowering the body 120. Accordingly, a range of motion between the just before the first end position and just before the second end position defines a manual modulation range of the hoist mode actuator 306. The hoist mode actuator 306 may be spring loaded, or otherwise biased on both sides of the central position, such that when a force for displacing the hoist mode actuator rearward or forward is no longer applied, the hoist mode actuator 306 moves in an elastic manner back to the central position without any additional input.

The first end position and the second end position correspond to an auto raise mode and an auto lower mode of the hoist system 320, respectively. During an operation of the machine 100 in which the hoist automatic mode actuator 304 has been operated to activate the auto raise mode and the auto lower mode, the hoist mode actuator 306 may be moved to the first end position or the second end position and released. Upon release, the hoist mode actuator 306 may move back to the central position. The auto raise or lower mode may be initiated according to the movement to the first or second end position, and canceled by a subsequent displacement from the central position.

As described in further detail below, in situations in which the hoist automatic mode actuator 304 has been operated to activate the auto raise mode and the auto lower mode, the first controller 310 may operate each of the engine 202, the transmission 204, the hoist system 320, and the brake system 339, automatically without additional input from an operator, upon the hoist mode actuator 306 being positioned in either of the first end position or the second end position. Where a current operation of the machine 100 does not allow for an automatic movement of the body 120 to be implemented, for example when one or more conditions for automatic operation of one or more of the engine 202, the transmission 204, the hoist system 320, and the brake system 339 is not met, the first controller 310 of the control system 300 may generate a status notification visible from inside the cab 104 indicating the automatic movement of the body 120 cannot be performed, or can be performed once one or more conditions related to the operation of the machine 100 have been met. On the other hand, in situations in which the hoist automatic mode actuator 304 has not been operated to activate the auto raise mode and the auto lower mode (or has been operated to cancel a previous activation), the first controller 310 may generate a status notification message visible within the cab 104 which indicates the auto raise and lower modes are not available.

The direction of movement of the body 120, and mode of operation of the hoist system 320 resulting from a displacement of the hoist mode actuator 306 from the central position may be displayed by the hoist mode indicator 416. The hoist mode indicator 416 may include devices, such as LEDs or other illumination devices, which are activated according a displacement of the hoist mode actuator 306, for individual mode indicators A↑, M↑, M↓, and A↓ respectively corresponding to an auto lower mode, a manual lower mode, a manual raise mode, and an auto raise mode.

The automatic brake actuator 308 is positioned on the grip 402 of the transmission range actuator 302 below the range actuator lock 420. Accordingly, an operator may access and operate each of the hoist mode actuator 306, the automatic brake actuator 308, and the range actuator lock 420 with a single hand. According to an aspect of the present disclosure, the hoist automatic mode actuator 304 may be positioned on the base 400, the grip 402, or the first housing 404 of the transmission range actuator 302.

As discussed above, the transmission range actuator 302 may include the base 400, the grip 402 mounted or extending from the grip 402, the first housing 404 extending from the upper portion of base 400, and the extension 408 attached to or extending from the lower portion of the base 400. Further, the extension 408 is positioned through the track 412 which guides the movement of the extension 408, and thus the transmission range actuator 302 in the rearward and forward directions.

According to an aspect of the disclosure, an actuator system may be provided with a transmission range actuator that includes a dial (not shown) that rotates about a rotational axis between positions corresponding to transmission ranges. The dial may include a profile of protrusions, columns, or dimples on an outer circumference of a main body (e.g. a grip), and an indentation or illumination device on a top surface of the main body. The indentation or illumination device may indicate (e.g. point) to one of a group of transmission range indicators provided on a surface adjacent to the dial. The main body may be pressed or pulled from an axial position along the rotational axis in order to lock the dial in a position corresponding to a transmission range, or unlock the dial for rotational movement between transmission ranges. The dial may be attached to the surface, and the main body may rotate around a central stationary body of the dial. The central stationary body may include a recess formed in an upper surface, or plurality of walls extending from the upper surface, to define a housing for a hoist mode actuator. The hoist mode actuator may be linearly or rotationally displaced, or moved otherwise, between positions corresponding to auto and manual raise and lower operations of the hoist system 320. An automatic brake actuator and a hoist automatic mode actuator may be positioned on the main body or the central stationary body.

According to an aspect of the disclosure, an actuator system may be provided with a touchscreen that is accessible from within the cab 104. An operator may select a desired transmission range or mode of operation for a hoist system by making selections on the touchscreen. The touchscreen may communicate with a controller, such as the first controller 310, and selections of an operator may be implemented by the controller.

Industrial Applicability

Industrial applicability of the system, methods, and computer readable medium for operating a hoist system herein described will be readily appreciated from the foregoing discussion.

Figure 5:
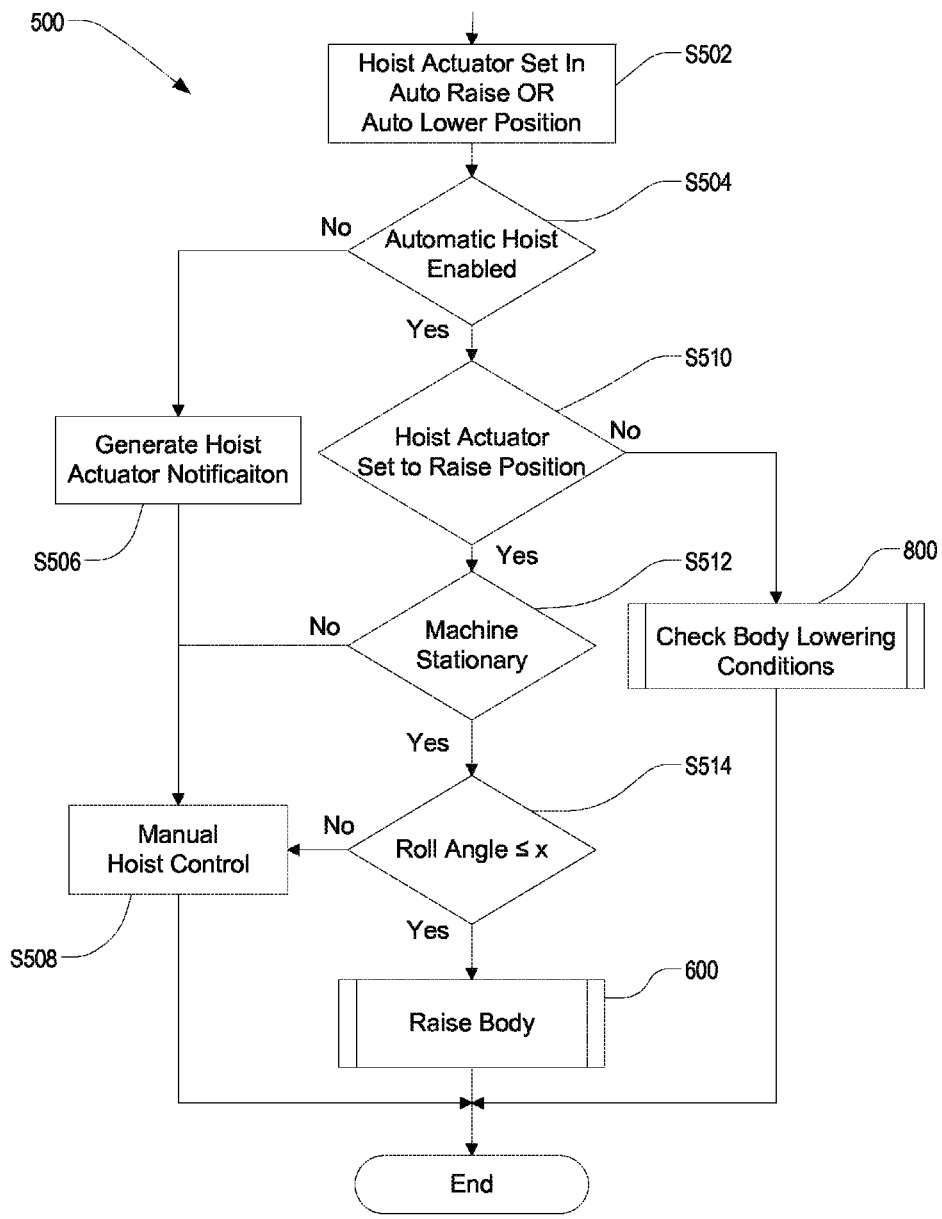
FIG. 5 is an algorithmic flowchart illustrating a method of actuating an automatic operation and a movement of a body of a machine, according to one aspect of the present disclosure.

FIG. 5 is an algorithmic flowchart illustrating a method 500 of actuating an automatic operation and movement of the body 120 of the machine 100, according to one aspect of the present disclosure. For illustration, the operations of the method 500 will be discussed in reference to FIGS. 1-4.

In block S502 a signal or other data from the hoist mode actuator 306 indicating the auto raise mode or the auto lower mode has been selected is received by the first controller 310. The first controller 310 accesses the hoist automatic mode actuator 304, or a memory device or log indicating a previous operation of the hoist automatic mode actuator 304 in block S504, to determine if the auto raise and lower modes have been activated. If the auto raise and lower modes have not been activated, at block S506, the first controller 310 generates a notification for an operator to see indicating the auto raise and lower modes have not been activated. Operation of the hoist system 320 occurs at block S508 according to a manual operation of the hoist mode actuator 306 within the manual modulation range. Accordingly, the hoist system 320 operates based on where the hoist mode actuator 306 is moved to and held relative to the central position which defines an active setting of the hoist mode actuator 306. As the hoist mode actuator 306 is released and returns to the central position, the valve 324 may move into the fourth valve position such that the body 120 is held at the position of the body 120 when the hoist mode actuator 306 was released.

If it is determined at block S504 that the auto raise and lower modes are enabled, i.e. the hoist automatic mode actuator 304 has been set or operated to enable the auto modes, the first controller 310 determines if the auto raise mode or the auto lower mode has been selected. If the auto lower mode has been selected, the first controller executes a body lowering conditions check algorithm 800 described in more detail below. Otherwise, in block S512, the first controller 310 communicates with at least one sensor to determine if the machine 100 is in a stationary state. In the event the machine 100 is not stationary, the hoist system 320 may be operated according to the manual operation of the hoist mode actuator 306 at block S508.

If the first controller 310 determines the machine 100 is stationary at block S512, another sensor which detects an angle about the roll axis 118 of the first frame 102 relative the second frame 110 (i.e. the roll angle), is accessed by the first controller 310 in block S514. If the roll angle is greater than a predetermined roll angle threshold (x), the first controller 310 does not operate the hoist system 320 to raise the body 120 automatically. As a result, the first controller 310 may operate the hoist system 320 in response to the manual operation of the hoist mode actuator 306 at block S508. However, if the roll angle is less than the roll angle threshold (x), the first controller 310 controls the hoist system 320 to raise the body 120 in an auto raise mode according to a body raise algorithm 600.

Figure 6:
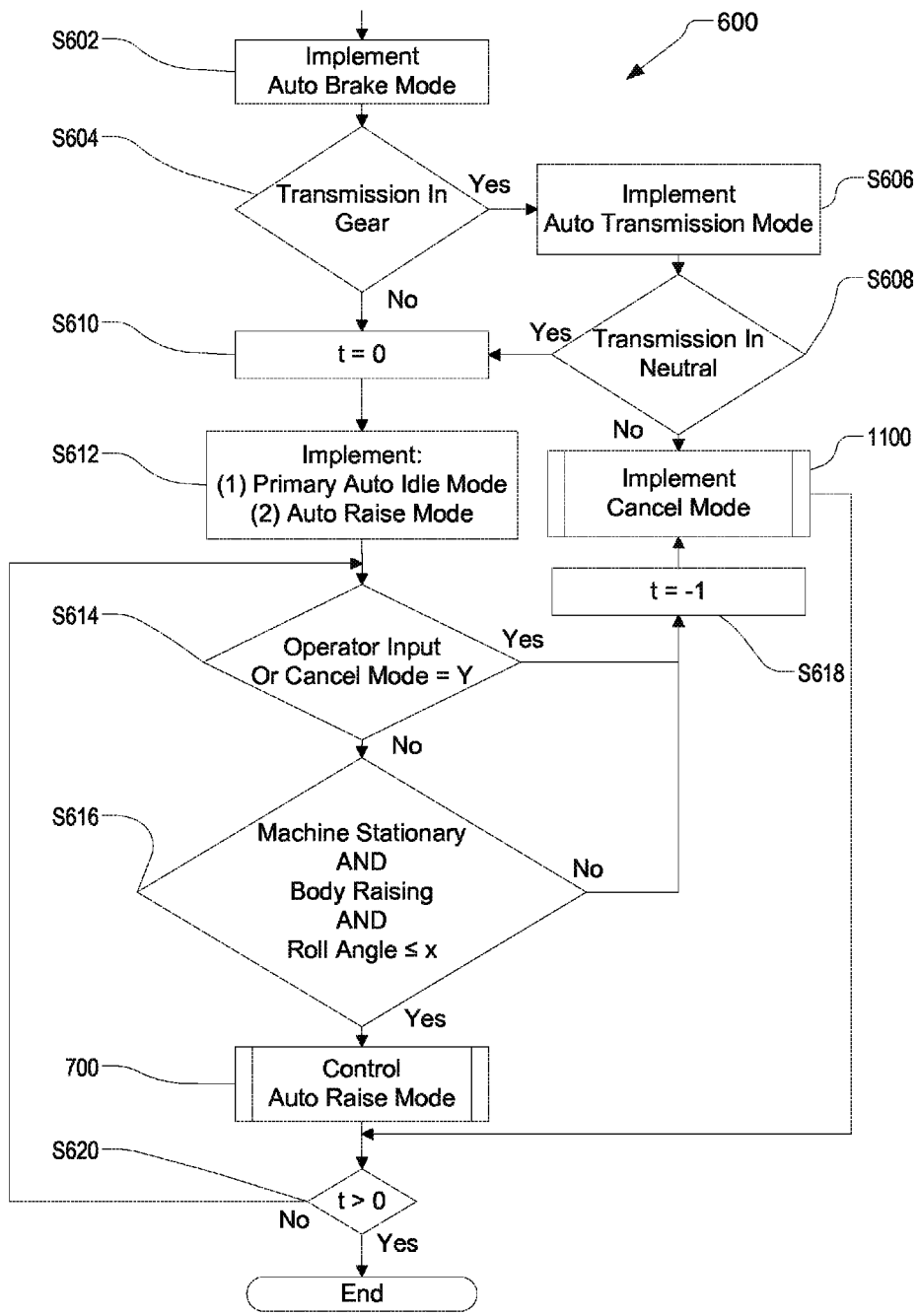
FIG. 6 is an algorithmic flowchart illustrating a method of raising a body, according to an aspect of the present disclosure.

An example of the body raise algorithm 600 is provided by an algorithmic flowchart of FIG. 6, which illustrates a method of raising the body 120 according to an aspect of the present disclosure. At block S602, the first controller 310 implements an automatic brake mode and communicates with the second controller 340 to operate the brake devices 342 in an automatic operation of the brake system 339. The first controller 310 may cause a notification message to be displayed on an instrumentation panel within the cab 104 once the brake devices 342 are operated according to the automatic brake mode, alerting an operator that an operation of the manual brake actuator 344 is no longer necessary. The first controller 310 determines the state of the transmission 204 at block S604 (e.g. whether the transmission is in a neutral transmission range or in a gear arrangement corresponding to the reverse or one of the drive transmission ranges). The first controller 310 may communicate with an electronic control module (ECM) or a transmission control module (TCM) to obtain a status of and operate the transmission 204. If the transmission 204 is in gear, the first controller 310 implements an automatic transmission mode in which the first controller 310 operates the transmission 204 to perform an automatic operation of the transmission 204 to change the transmission range to the neutral transmission range at block S606. According to one aspect of the present disclosure, an implementation of the automatic transmission mode may include operating the inter-axle differential lock of the torque transmitting arrangement 210 to be in a locked position prior to changing the transmission range of the transmission 204. At block S608, the state of the transmission is again determined, and if the transmission 204 is not in the neutral transmission range, the first controller 310 proceeds to execute a cancel mode implementation algorithm 1100. As described in more detail below, among other operations, an automatic raise operation according to an execution of the body raise algorithm 600 may be canceled with the execution of the cancel mode implementation algorithm 1100.

If the first controller 310 determines that the transmission is in the neutral transmission range in either block S604 or block S608, a first algorithmic variable (t) is set to zero at block S610. As describe in more detail below, the first algorithmic variable (t) may be used to indicate the body 120 is at the first body position A or the second body position B, or to indicate which of the automatic raised and automatic lower operations has been initiated. The first controller 310 implements a primary auto idle mode and an auto raise mode in block S612. In the primary auto idle mode, the first controller 310 may communicate and control the engine 202, for example via an ECM, to perform an automatic operation of the engine 202 to increase an output of the engine 202 in an idle state, i.e. the first controller 310 increases an idle level of the engine 202 in an adjustment to a first idle level. The increased output is transmitted through the transmission 204 to the second transmission shaft 312 which drives the pump 322 and thereby increases the output of the pump 322. Thus, a force generated by the operation of the engine 202 is effectively transmitted to the hoist system 320 according to the idle level of the engine 202. At the same time, the first controller 310 controls the valve 324 in an automatic operation of the hoist system 320, to be in the first valve position and the driven member 332 is driven by the supply of working fluid to the first fluid port 334 from the pump 322 to raise the body 120.

As the primary auto idle mode and the auto raise mode are being carried out, the body raise algorithm 600 moves to block S614. At block S614, if certain operator inputs have not occurred or a reference flag has not been set to Y, the body raise algorithm 600 moves to block S616. According to an aspect of the present disclosure, a status of the flag being set to Y indicates the cancel mode implementation algorithm 1100 has been executed during a previous execution of an algorithm of the present disclosure, such as the body raise algorithm 600. At block S616 the first controller 310 accesses a plurality of sensors such as the sensor that monitors the motion of the machine 100, the sensor that detects the roll angle, or the sensor 338 for determining the position and/or movement of the body 120. As a result, the first controller 310 determines whether the machine 100 has remained in the stationary position, if the roll angle is still below the roll angle threshold (x), and if the body 120 is being raised.

If the machine 100 is stationary, the body 120 is being raised, and the roll angle is less than or equal the roll angle threshold (x), the first controller 310 executes an auto raise mode control algorithm 700. Otherwise, if one or more specific operator inputs have occurred, or the flag is set to Y, or any of the conditions in block S616 is not satisfied, the first algorithmic variable (t) is set to −1 in block S618, and the first controller 310 executes the cancel mode implementation algorithm 1100. Once either of the auto raise mode control algorithm 700 or the cancel mode implementation algorithm 1100 have been executed, the value of the first algorithmic variable (t) is compare to a value of zero. If the first algorithmic variable (t) is not greater than zero, the first controller 310 again determines if certain operator inputs have occurred, if the flag is set to Y, and if certain operating conditions are in effect in blocks S614 and S616. If the first algorithmic variable (t) is not greater than zero, the body 120 may not have reached the second body position B or the flag may have been cleared through the execution of the cancel mode implementation algorithm 1100, and the first controller 310 returns to block S614. If the first algorithmic variable (t) is greater than zero, then the body 120 is in the second body position B and the execution of the body raise algorithm 600 is ended.

Figure 7:
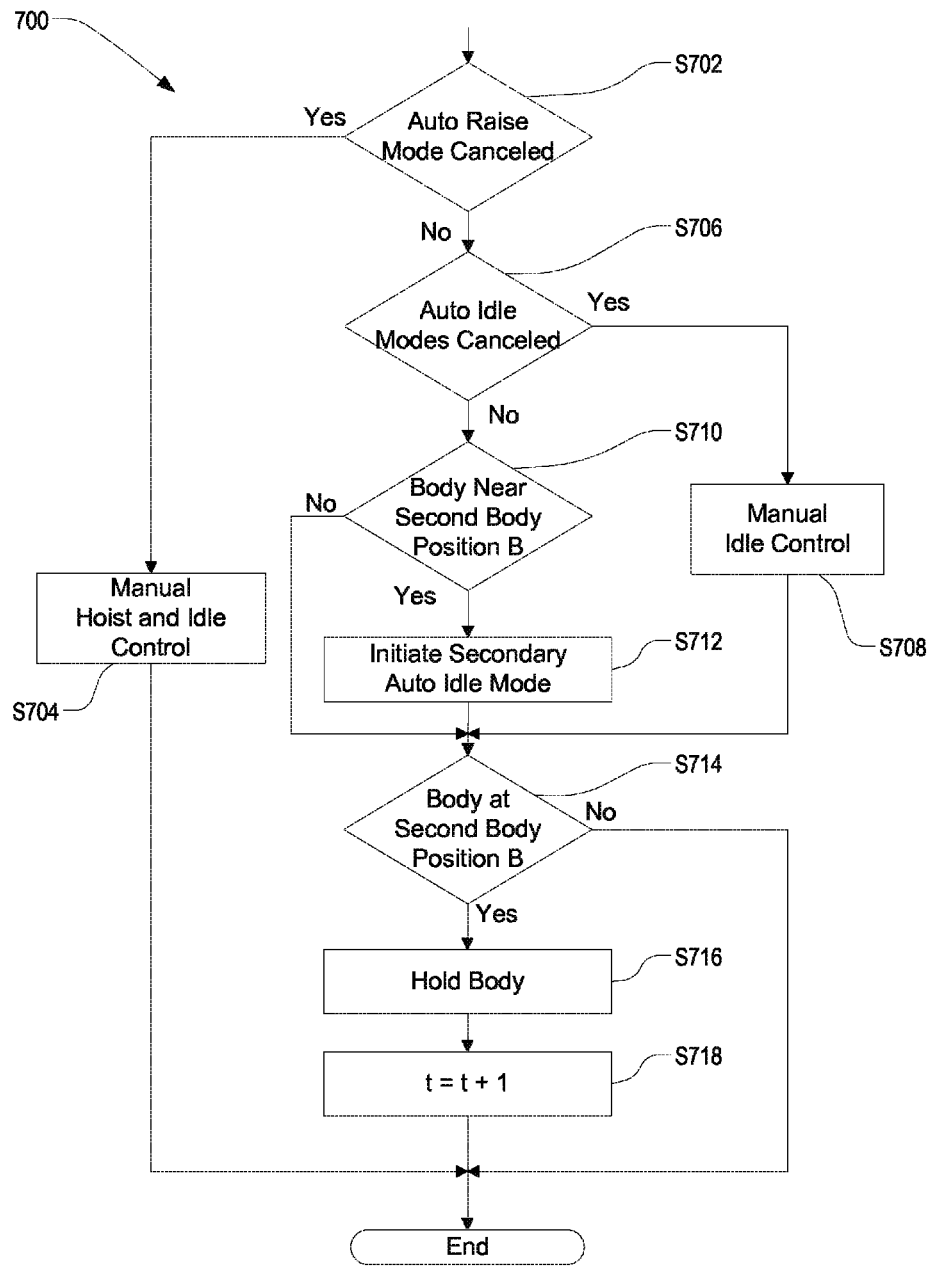
FIG. 7 is an algorithmic flowchart illustrating a method of controlling an auto raise mode of a hoist system, according to an aspect of the present disclosure.

An example of the auto raise mode control algorithm 700 is provided by an algorithmic flowchart of FIG. 7, which illustrates a method of controlling the auto raise mode of the hoist system 320 according to an aspect of the present disclosure. At block S702, it is determined if the auto raise mode has been canceled which may be a result of an execution of the cancel mode implementation algorithm 1100. If the auto raise mode has been canceled, at block S704, operation of the engine 202 is controlled according manual operations of the throttle 346, and operation of the hoist system 320 and movement of the body 120 is controlled according to manual operations of the hoist mode actuator 306 within the manual modulation range.

If the auto raise mode has not been canceled, the first controller 310 determines if the primary and secondary auto idle modes have been canceled in block S706, which may be a result of an execution of the cancel mode implementation algorithm 1100. If the primary and secondary auto idle modes have been canceled, the body 120 continues to automatically rise at block S708 without any additional operation of the hoist mode actuator 306, while the speed (e.g. a ramp rate) of the raising motion depends from the operation by an operator of the throttle 346. More specifically, an operator may control the output of the engine 202 in an idle state, and thus the outputs of the second transmission shaft 312 and the pump 322 which drives the driven member 332 in each actuator cylinder 330. According to one aspect of the present disclosure, if an operator stops operating the throttle 346, the first controller 310 may automatically revert back to operating the hoist system 320 in the primary auto idle mode or hold the body 120 in a current position.

If the primary and secondary auto idle modes have not been canceled, the first controller 310 communicates with the sensor 338 at block S710 to determine if a position of the body 120 as it is being raised, is within a predetermined range of the second body position B. If the position of the body 120 is within the predetermined range, a second auto idle mode is implemented at block S712, otherwise the hoist system 320 continues to be operated according to the primary auto idle mode. In the second auto idle mode, the first controller 310 controls and adjusts the idle to be reduced in adjustment to a second idle level, and thus an output of the engine 202 transmitted through the second transmission shaft 312 to the pump 322. Accordingly, the output of the pump 322, which drives the driven members 332 in the actuator cylinders 330, is reduced. In turn, the body 120 continues to be raised automatically, but at a reduced rate over a range of movement between a current position and the second body position B (e.g. a full raise position). Reducing the speed of the body 120 near the second body position B results in both the body 120 and the driven members 332 moving with less speed and momentum when the driven members 332 reach the ends of respective actuator cylinders 330. Accordingly, even during an automatic raising of the body 120, the body 120 and the driven members 332 will be subject to less of a hard stop. This will reduce impact forces between components that come into contact in the second body position B. As a result of implementing the secondary auto idle mode, wear and a risk of damage of components of the body 120 and the hoist system 320 as a result of repeated automatic raise operations may be reduced.

In block S714, the first controller 310 accesses the sensor 338 again to determine if the position of the body 120 is at the full raise position. If the body 120 is not at the full raise position the auto raise mode control algorithm 700 ends. However, if the body 120 is at the full raise position, the first controller 310 operates the valve 324 at block S716 to be positioned in the fourth valve position in order to hold the body 120 in the full raise position. In holding the body 120 in the full raise position, the first controller 310 maintains the valve 324 in the fourth valve position such that the actuator cylinders 330 remain pressurized, while the flow of the working fluid to the actuator cylinders 330 is prevented. Next, the first controller 310 increases the value of the first algorithmic variable (t) by 1.

Figure 8:
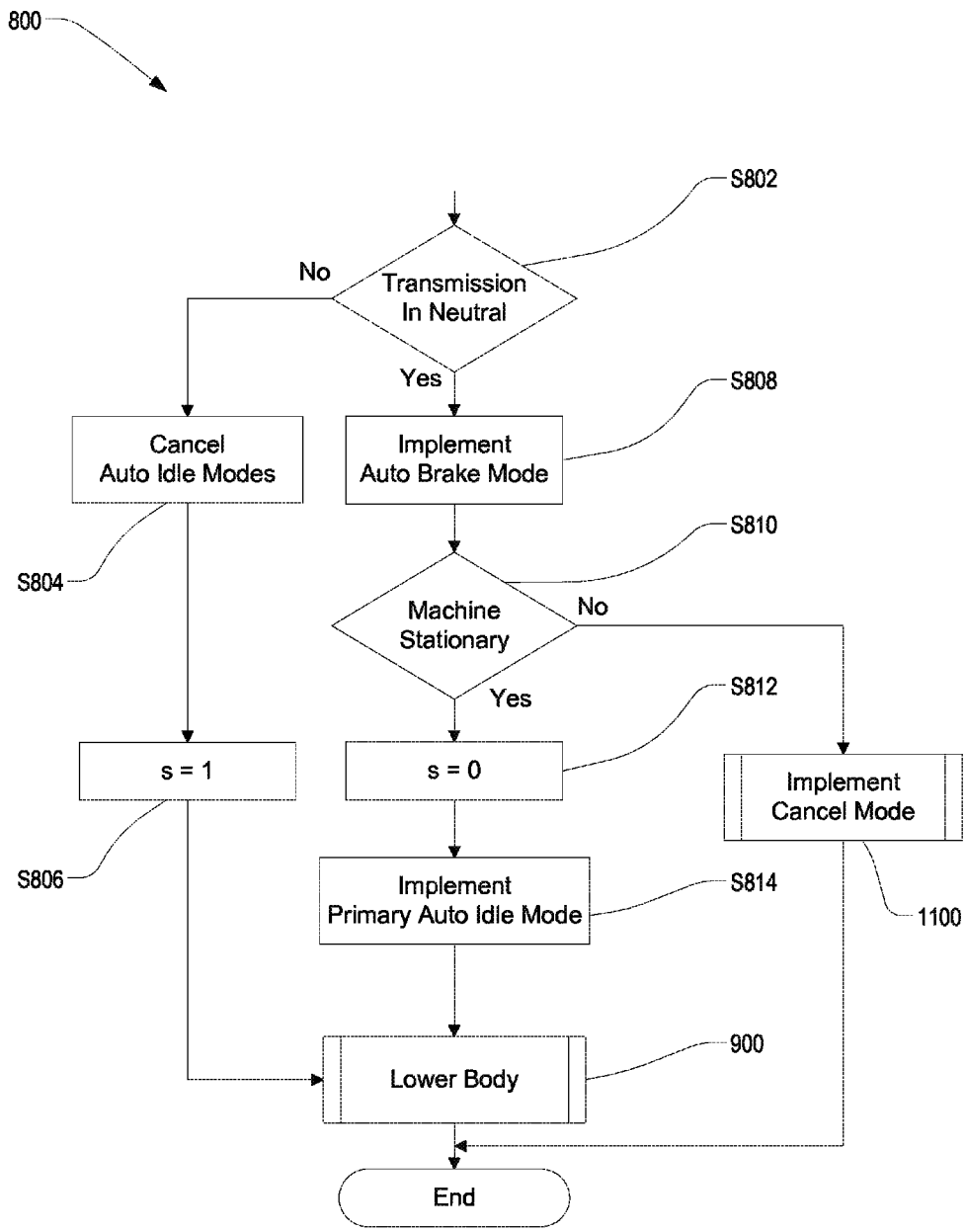
FIG. 8 is an algorithmic flowchart illustrating a method of evaluating conditions for lowering a body of a machine, according to an aspect of the present disclosure.

An example of the body lowering conditions check algorithm 800 is provided by an algorithmic flowchart of FIG. 8, which illustrates a method of evaluating conditions for lowering the body 120 of the machine 100 according to an aspect of the present disclosure. In block S802, the first controller 310 determines whether the transmission 204 is in the neutral transmission range. If the transmission 204 is not in the neutral transmission range, the first controller 310 cancels the primary and secondary auto idle modes. This may correspond to a circumstance in which a request in an automatic lower operation when the machine 100 is pulling away and an operator wants to simultaneously lower the body 120. The second algorithmic variable (s) is set to 1 in block S806 and the first controller 310 executes a body lower algorithm 900. The second algorithmic variable (s) is used by the first controller 310 as a reference variable that indicates whether a first type of automatic lower operation, which occurs as the machine 100 is stationary, or a second type of automatic lower operation, in which the machine 100 is moving, has been requested by an operator. According to an aspect of the present disclosure, in the second type of automatic lower operation, the first controller 310 may determine a speed of the machine 100 with a speed sensor and delay the execution of the body lower algorithm 900 until the machine 100 reaches a predetermined speed.

If it is determined at block S802 that the transmission 204 is in the neutral transmission range, the first controller 310 implements the auto brake mode in block S808 in an automatic operation of the brake system 339. Accordingly, the first controller 310 communicates with the second controller 340 to operate the brake devices 342. In block S810, the first controller 310 determines if the machine 100 is stationary through communication with the sensor that monitors movement of the machine 100. If the machine 100 is not stationary, the first controller 310 executes the cancel mode implementation algorithm 1100. Alternatively, if it is determined the machine 100 is stationary at block S810, the second algorithmic variable (s) is set to a value of 0 in block S812. Next, in block S814, the first controller 310 controls and adjusts an idle of the engine 202 according to the primary auto idle mode (e.g. increases an idle to a predetermined idle level for moving the body 120 automatically at a predetermined rate) in an automatic operation of the engine 202. Once the primary auto idle mode is implemented in block S814, the first controller 310 controls the hoist system 320 to lower the body 120 in an auto lower mode according to the body lower algorithm 900.

Figure 9:
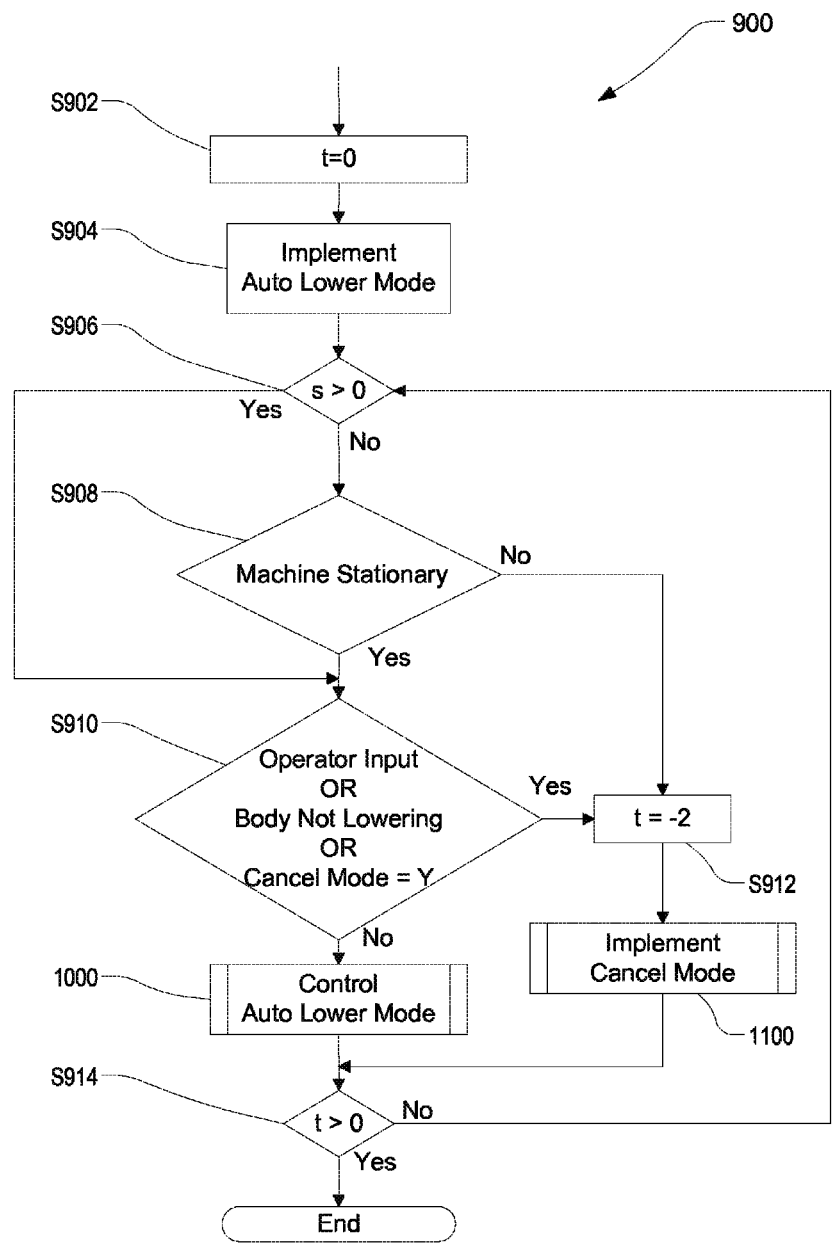
FIG. 9 is an algorithmic flowchart illustrating a method of lowering a body of a machine, according to an aspect of the present disclosure.

An example of the body lower algorithm 900 is provided by an algorithmic flowchart of FIG. 9, which illustrates a method of lowering the body 120 of the machine 100 according to an aspect of the present disclosure. In block S902, the first controller 310 sets the first algorithmic variable (t) to zero. The first controller 310 implements the auto lower mode in block S904 and controls the valve 324 to be in the second valve position in an automatic operation of the hoist system 320.

In block S904, the driven member 332 is driven by the supply of working fluid to the second fluid port 336 from the pump 322 to automatically lower the body 120. If the primary auto idle mode was implemented and the idle of the engine was increased in block S814 (i.e. the first type of automatic lower operation), the increased output from engine 202 is transmitted to the second transmission shaft 312 which drives the pump 322. Otherwise, the second type of automatic lower operation is performed in which the output of the engine 202 resulting from an operation of the throttle 346 by an operator driving the machine 100 is transmitted to drive the pump 322 and lower the body 120 automatically. As previously described, the second automatic lower operation corresponds to a situation in which the hoist mode actuator 306 is moved into the position corresponding to the auto lower mode after the hoist automatic mode actuator 304 has been operated and while the machine 100 is being driven. According to one aspect of the present disclosure, a torque limiting device may be operatively engaged with the second transmission shaft 312 to limit the torque transmitted to or by the second transmission shaft 312 in order to limit the output of the pump 322 in certain situations, such as when the machine 100 is operated to accelerate rapidly or is being driven at a predetermined speed.

In block S906, the first controller 310 determines which type of automatic lower operation is being performed by determining if the second algorithmic variable (s) is greater than zero. If the second algorithmic variable (s) is greater than zero, various operating conditions are evaluated in block S910. Otherwise, the first controller 310 determines if the machine 100 is still stationary in block S908. Thus, first controller 310 effectively monitors a position of the machine 100 to determine if the machine 100 has remained stationary in order to perform the first type of automatic lower operation. If it is determined that the machine is still stationary in block S908, the various operating conditions are evaluated in block S910. Specifically, the first controller 310 determines if certain operator inputs have occurred, if the body 120 is not lowering, and if the status of the flag is set to Y.

If the first controller 310 determines the machine 100 is no longer stationary in block S908, or if any conditions evaluated in block S910 are determined to be in effect, the first algorithmic variable (t) is set to −2 in block S912, and the first controller 310 proceeds to execute the cancel mode implementation algorithm 1100. If the machine 100 is stationary and none of the conditions of block S910 are in effect, the first controller 310 executes an auto lower mode control algorithm 1000.

Subsequent to an execution of the cancel mode implementation algorithm 1100 or the auto lower mode control algorithm 1000, in block S920, the value of the first algorithmic variable (t) is evaluated. If the first algorithmic variable (t) is not greater than zero, the body 120 may not have reached the first body position A or the flag may have been cleared through the execution of the cancel mode implementation algorithm 1100, and the first controller 310 returns to block S906. If the first algorithmic variable (t) is greater than zero than the body 120 is in the first body position A and the execution of the body lower algorithm 900 is ended.

Figure 10:
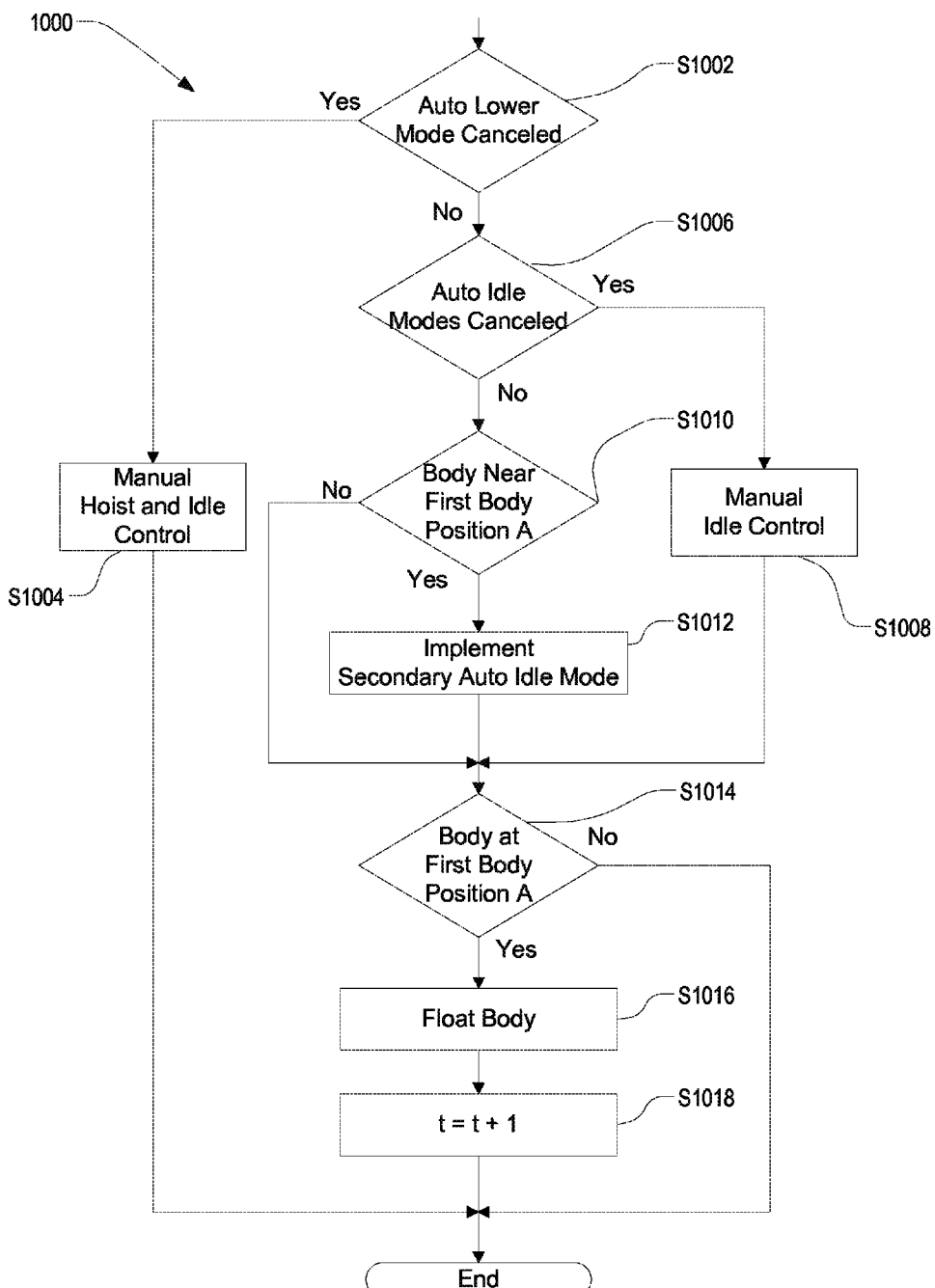
FIG. 10 is an algorithmic flowchart illustrating a method of controlling an auto lower mode of a hoist system, according to an aspect of the present disclosure.

An example of the auto lower mode control algorithm 1000 is provided by an algorithmic flowchart of FIG. 10, which illustrates a method of controlling the auto lower mode of the hoist system 320 according to an aspect of the present disclosure. At block S1002, it is determined if the auto lower mode has been canceled, which may be a result of an execution of cancel mode implementation algorithm 1100. If the auto lower mode has been canceled, at block S1004, operation of the engine 202 is controlled according manual operations of the throttle 346, and operation of the hoist system 320 and movement of the body 120 is controlled according to manual operations of the hoist mode actuator 306 within the manual modulation range.

If the auto lower mode has not been canceled, the first controller 310 determines if the primary and secondary auto idle modes have been canceled in block S1006, which may be a result of an execution of the cancel mode implementation algorithm 1100. If the primary and secondary auto idle modes have been canceled, the body 120 continues to automatically lower at block S1008 without any additional operation of the hoist mode actuator 306, while the speed of the lowering motion depends from the operation by an operator of the throttle 346. More specifically, an operator may control the output of the engine 202 in an idle state, and thus the outputs of the second transmission shaft 312 and the pump 322 which drive the driven member 332 in each actuator cylinder 330. According to one aspect of the present disclosure, if an operator stops operating the throttle 346, the first controller 310 may automatically revert back to operating the hoist system 320 in the primary auto idle mode or hold the body 120 in a current position.

If the primary and secondary auto idle modes have not been canceled, the first controller 310 communicates with the sensor 338 at block S1010 to determine if a position of the body 120 as it is being lowered, is within a predetermined range of the first body position A. If the position of the body 120 is within the predetermined range, a second auto idle mode is implemented at block S1012. Otherwise, the hoist system 320 continues to operate with the primary auto idle mode in effect. In the second auto idle mode, the first controller 310 reduces an idle in an automatic operation of the engine 202, and thus an output of the engine 202 transmitted through the second transmission shaft 312 to the pump 322. Accordingly, the output of the pump 322, which drives the driven members 332 in the actuator cylinders 330, is reduced. In turn, the body 120 continues to be lowered automatically, but at a reduced rate over a range of movement between a current position and the first body position A (e.g. a full lower position). Reducing the speed of the body 120 near the full lower position results in both the body 120 and the driven members 332 moving with less speed and momentum when the driven members 332 reach lower ends of respective actuator cylinders 330. Accordingly, even during an automatic lowering of the body 120, the body 120 and the driven members 332 is subject to less of a hard stop. This reduces impact forces between components that come into contact in the first body position A. As a result of implementing the secondary auto idle mode, wear and a risk of damage to components of the body 120 and the hoist system 320 as a result of repeated automatic lower operations may be reduced.

According to one aspect of the present disclosure, the first controller 310 may also initiate a float operation by the hoist system 320 in response a predetermined period of time elapsing and/or the body 120 reaching a predetermined position relative to the first body position A while the body 120 is being lowered in accordance with the second auto idle mode. During the float operation, the first controller 310 operates the valve 324 to be in the third valve position and the hoist device 130 is depressurized. As a result, the body 120 is permitted to move under its own weight to the first body position A. Thus, the float operation may prevent the body 120 from coming down on the chassis 112 under power which may further prevent wear and damage to machine components. The float operation may also be implemented during block S1008, or any other lowering operation, when the body 120 reaches the predetermined position relative to the first body position A.

In block S1014, the first controller accesses the sensor 338 again to determine if the body 120 is positioned in the full lower position. If the body 120 is not in the first body position A the auto lower mode control algorithm 1000 ends. However, if the body 120 is positioned at the first body position A, the first controller 310 operates the valve 324 at block S1016 to be positioned in, or remain in, the third valve position in order to allow the body 120 to be in a float state with the body 120 in the first body position A. Accordingly, the actuator cylinders 330 are not pressurized, and body 120 may move as a result of vertical movements of the chassis 112 as the machine 100 is driven, for example, over uneven surfaces. In block S1018, the first controller 310 increases the value of the first algorithmic (t) variable by 1.

As a result of leaving the body 120 to float in block S1016, working fluid is not sealed within the actuator cylinders 330 restraining movements of respective driven members 332. Thus, working fluid is not present within the actuators cylinders 330 in a pressurized state applying pressure to sealing components and other components of the actuator cylinders 330. Thus, wear and tear on the actuator cylinders 330 and components therein, may be reduced during a hoisting cycle, which may increase an operating life of each of the actuator cylinders 330.

According to another aspect of the present disclosure, instead of allowing the body 120 to remain in a floating state in block S1016, the first controller 310 may operate the valve 324 to be positioned in the fourth valve position to hold the body 120 in the full lower position. The first controller 310 may maintain the valve 324 in the fourth valve position such that the actuator cylinders 330 remain pressurized, while the flow of the working fluid to the actuator cylinders 330 is prevented. This prevents the body 120 from moving as a result of vertical movements of the chassis 112 as the machine 100 is driven, for example, over uneven surfaces. Accordingly, wear and tear of components that absorb, resist, or enable the movement of the body 120 may be reduced.

Figure 11:
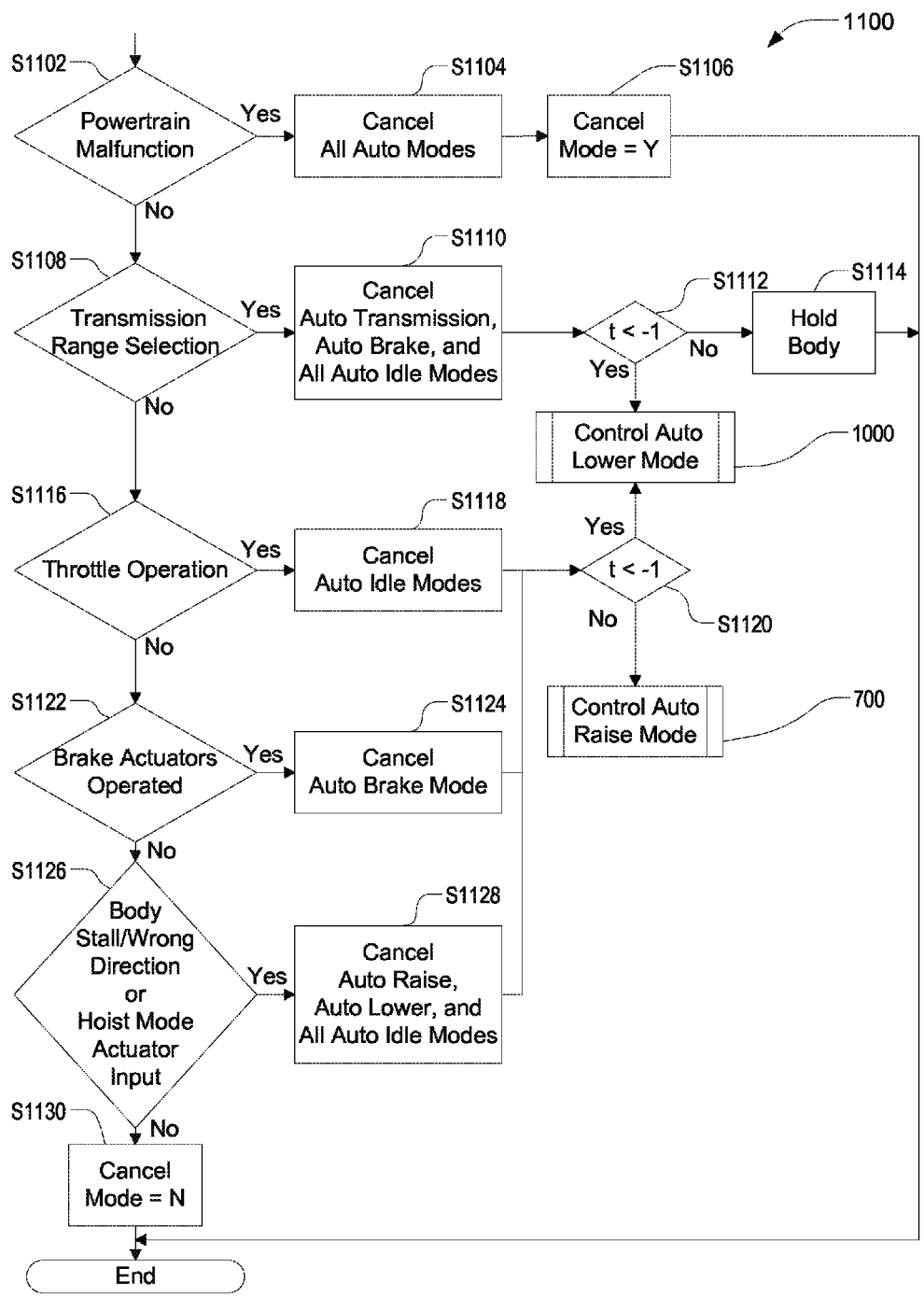
FIG. 11 is an algorithmic flowchart illustrating a method of canceling automatic modes of an engine, a transmission, a brake system, and a hoist system of a machine, according to an aspect of the present disclosure.

An example of the cancel mode implementation algorithm 1100 is provided by an algorithmic flowchart of FIG. 11, which illustrates a method of canceling automatic modes of the engine 202, the transmission 204, the brake system 339, and the hoist system 320 of the machine 100, according to an aspect of the present disclosure.

In block S1102, the first controller 310 determines if the powertrain 200 or the brake system 339 has malfunctioned or is continuing to malfunction from a previous iteration of the body raise algorithm 600, the auto raise mode control algorithm 700, the body lowering conditions check algorithm 800, or the auto lower mode control algorithm 1000.

For example, the first controller 310 may determine that the transmission 204 is unable to shift into to the neutral transmission range in block S606 of the body raise algorithm 600, or the transmission has shifted out of the neutral transmission range without input from the operator which may cause the machine 100 to no longer be stationary. According to another aspect of the invention, a failure of the brake system 339 may cause the machine 100 to no longer be stationary, which may have been determined at block S616 of the body raise algorithm 600 or block S810 of the body lowering conditions check algorithm 800. If these or other malfunctions of the powertrain 200 or the brake system 339 occur while the method 500 of actuating a movement of the body 120 is being carried out, the cancel mode implementation algorithm 1100 moves to block S1104.

In block S1104, all auto modes, including the auto idle, the auto brake, the auto transmission, and the auto raise and lower modes are canceled. As a result, full control an operator is provided with full control of the engine 202, transmission 204, brake system 339, and hoist system 320. In block S1106, the flag is set to Y and the cancel mode implementation algorithm 1100 ends.

Where a malfunction has not occurred, the first controller 310 determines if an operator has operated the transmission range actuator 302 in block S1108. For example, it may be determined that the operator has depressed the range actuator lock 420 and moved the base along the track 412 from a position corresponding to the neutral transmission range to a position corresponding to the drive transmission range or the reverse transmission range. Next, in block S1110, the first controller 310 cancels the auto idle, the auto brake, and the auto transmission modes such that operator has control of the corresponding components and systems.

The first controller 310 evaluates the value of the first algorithmic variable (t) in block S1112 to determine whether the body 120 was in the process of the automatic raise operation or the automatic lower operation. Where the body 120 was in the process of the automatic raise operation, the first algorithmic variable (t) was set to −1 in block S618 of the body raise algorithm. Accordingly, the first algorithmic variable (t) is determined to be not less than −1 and the first controller 310 operates the valve 324 to move into the fourth valve position to hold the body in block S1114 and then the cancel mode implementation algorithm 1100 ends.

Where the body 120 was in the process of the automatic lower operation, the first algorithmic variable (t) was set to −2 in block S912 of the body lower algorithm 900. Accordingly, it is determined the first algorithmic variable (t) is less than −1 and the first controller 310 executes the auto lower mode control algorithm 1000. An example of a situation in which an operator may operate the transmission range actuator 302 is where the auto lower mode has been selected while the machine 100 is stationary and an operator has decided to pull away from a dump site and spread the contents of the body 120 over an area. According to an aspect of the present disclosure, the automatic lower operation may continue, or be stopped until the machine 100 reaches a predetermined speed, and then continued.

If a new transmission range has not been selected, it is determined in block S1116 whether the throttle 346 has been operated by an operator. In response to the operation of the throttle 346, the first controller 310 cancels the primary and secondary auto idle modes for the engine 202 in block S1118. Next, depending on the evaluation of the value of the first algorithmic variable (t) in block S1120, which in turn indicates whether the body 120 was in the process of being automatically raised or lowered as previously discussed, the first controller 310 executes the auto raise mode control algorithm 700 or the auto lower mode control algorithm 1000. Thus, as a result of the execution of the cancel mode implementation algorithm 1100, an operator is given control of the idle of the engine 202 in block S708 of the auto raise mode control algorithm 700 or block S1008 of the auto lower mode control algorithm 1000. As discussed in detail above, the output of the engine 202 can be increased or decreased according to the operation of the throttle 346, and is transmitted by the transmission 204 and the second transmission shaft 312 to drive the pump 322. Accordingly, the body 120 is raised or lowered at a rate corresponding to the output of the engine 202 resulting from an operation of the engine 202 at the idle level selected by an operator.

If an operation of the throttle 346 has not occurred or has been previously addressed while the machine 100 is stationary, the first controller 310 determines if the automatic brake actuator 308 and the manual brake actuator 344 are being operated. If the automatic brake actuator 308 is operated (e.g. if the automatic brake actuator 308 is pushed and held or pushed and released) while the manual brake actuator 344 is being continuously operated, the auto brake mode is canceled at block S1124. Depending on the result of the evaluation of the first algorithmic variable (t) in block S1120, the first controller 310 executes the auto raise mode control algorithm 700 or the auto lower mode control algorithm 1000. An operator has full control of the brake system 339 while the auto raise mode control algorithm 700 or the auto lower mode control algorithm 1000 are executed, which include the implementation of the secondary auto idle mode in block S712 or block S1012.

Where a combined operation of the automatic brake actuator 308 and manual brake actuator 344 has not occurred, the first controller 310 communicates with the sensor that monitors the roll angle and/or determines if the hoist mode actuator 306 has been operated in block S1126. In the event that the roll angle is greater than the threshold roll angle (x) or the hoist mode actuator 306 has been operated (during an automatic movement of the body 120), the auto raise, auto lower, primary auto idle, and secondary auto idle modes are canceled in block S1128. Depending on the result of the evaluation of the first algorithmic variable (t) in block S1120, the first controller 310 executes the auto raise mode control algorithm 700 or the auto lower mode control algorithm 1000. An operator has full control of the hoist system 320 according to blocks S702 and S704 of the auto raise mode control algorithm 700, or blocks S1002 and S1004 of the auto lower mode control algorithm 1000. As a result the first controller 310 controls the hoist system 320 to move the body 120 according to a direction of operation of the hoist mode actuator 306 as operated by an operator.

Where none of the conditions evaluated in blocks S1102, S1108, S1116, S1122, and S1126 are in effect, the cancel mode implementation algorithm 1100 moves to block S1130 and the flag is set to N. This may correspond to a situation in which a result from blocks S608, S614, S616, S810, S908, or S910 is a false positive. Alternatively, the setting of the flag to N may be a result of a condition, such as the powertrain 200 or the brake system 339 malfunctioning, having been resolved such that an automatic raise or automatic lower operation can be performed. According to one aspect of the present disclosure, blocks S1102, S1108, S1116, S1122, and S1126 may be executed in any order within the cancel mode implementation algorithm 1100.

Figure 12:
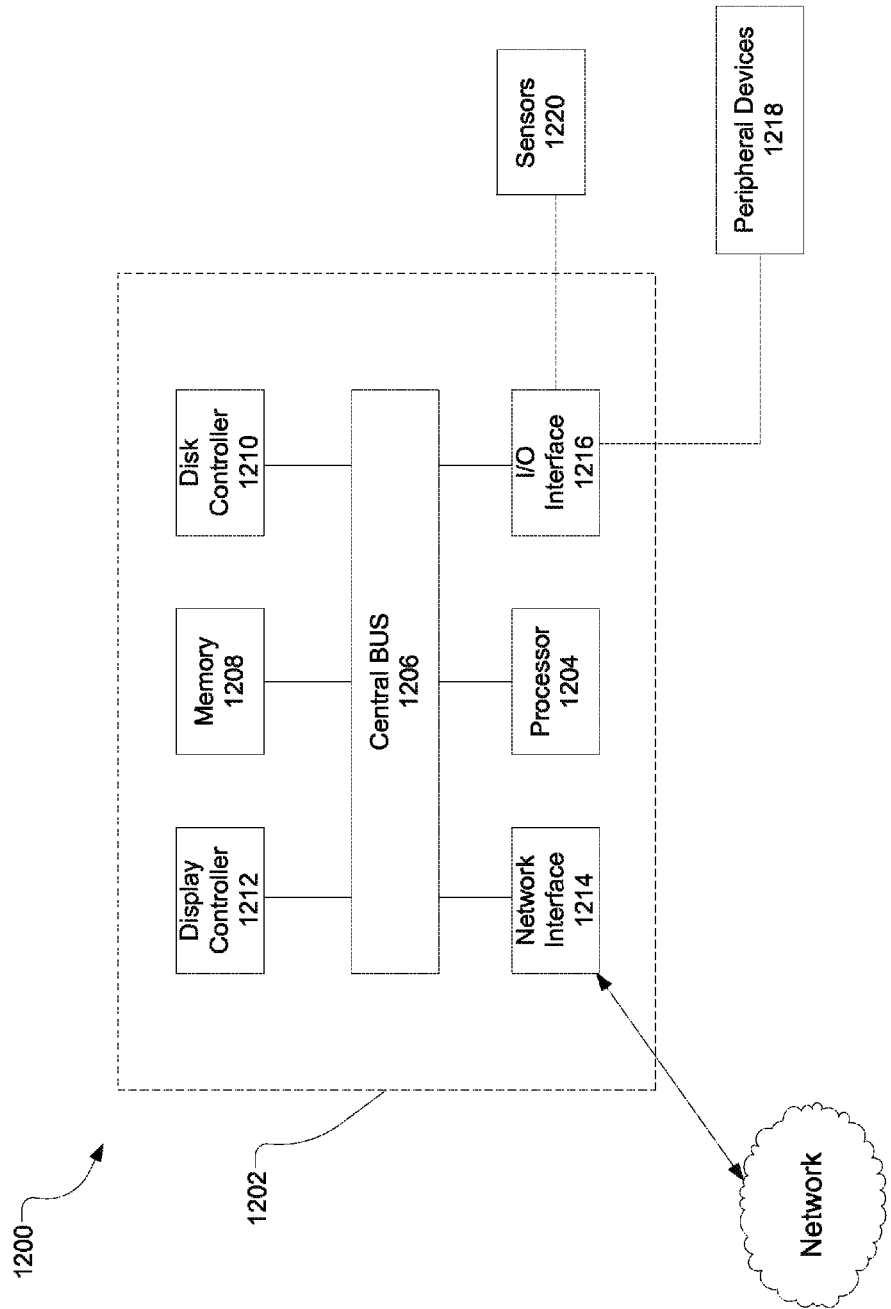
FIG. 12 illustrates a general-purpose computer system, according to an aspect of the present disclosure.

FIG. 12 illustrates a general-purpose computer system 1200, according to an aspect of the present disclosure. The general-purpose computer system 1200 includes or is configured to access one or more computer-accessible media, and includes a computing device 1202 with exemplary hardware incorporated therein. According to an aspect of the present disclosure, the first controller 310 or the second controller 340 may include or be defined by the computing device 1202, and the exemplary hardware illustrated in FIG. 12 may implement and/or execute the processes, algorithms and/or methods described in the present disclosure.

The computing device 1202 may include a processor 1204 with one or more processors (which may be referred herein singularly as the processor 1204 or in the plural as the processors 1204) coupled via a central BUS 1206 or other type of I/O interface, to a memory 1208. The computing device 1202 may further include a disk controller 1210, a display controller 1212, a network interface 1214, and an I/O interface 1216 coupled to the central BUS 1206.

In various aspects, the processor 1204 of the computing device 1202 may be a uniprocessor system including one processor, or a multiprocessor system including several processors (e.g., two, four, eight, or another suitable number). The processors 1204 may be any suitable processors, including application specific processors (ASP), capable of executing instructions. As another example, in various aspects, the processor(s) may be general-purpose or embedded processors implementing any of a variety of instruction set architectures (ISAs), such as the x86, PowerPC, SPARC, or MIPS ISAs, or any other suitable ISA. In multiprocessor systems, each of the processors 1204 may commonly, but not necessarily, implement the same ISA.

According to an aspect of the present disclosure, the processor 1204 may include a logic device for augmenting or fully implementing the methods and algorithms of the present disclosure. Such a logic device may include, but is not limited to, an application-specific integrated circuit (ASIC), a field programmable array (FPGA), a generic-array of logic (GAL), and their equivalents. Further, general-purpose computer system 1200 may benefit from parallel processing capabilities of a multi-cored central processing unit (CPU).

The system memory 1208 may be configured to store instructions and data accessible by the processor(s) 1204. In various aspects, the memory 1208 may be implemented using any suitable memory technology, such as static random access memory ("SRAM"), synchronous dynamic RAM ("SDRAM"), nonvolatile/Flash®-type memory, or any other type of memory (e.g., ROM, EPROM, EEPROM, DRAM, and their equivalents). Program instructions and data implementing one or more desired functions, such as those methods, techniques and data described above, may be stored within the memory 1208 as code and data.

In some aspects, the memory 1208 may be one aspect of a computer-accessible medium configured to store program instructions and data as described above for implementing aspects of the corresponding methods and apparatus. However, in other aspects, program instructions and/or data may be received, sent, or stored upon different types of computer-accessible media. Generally speaking, a computer-accessible medium may include non-transitory storage media or memory media, such as magnetic or optical media, e.g., disk or DVD/CD controller coupled to the computing device 1202 via the central BUS 1206, an in particular via the disk controller 1210. A non-transitory computer-accessible storage medium may also include any volatile or non-volatile media, such as RAM (e.g., SDRAM, DDR SDRAM, RDRAM, SRAM, etc.), ROM, etc., that may be included in some aspects of the computing device 1202 as the memory 1208 or another type of memory.

Further, a computer-accessible medium may include transmission media or signals, such as electrical, electromagnetic or digital signals, conveyed via a communication medium, such as a network and/or a wireless link, such as those that may be implemented via the network interface 1214. Portions or all of multiple computing devices, such as those illustrated in FIG. 12, may be used to implement the described functionality in various aspects; for example, software components running on a variety of different devices and servers may collaborate to provide the functionality. In some aspects, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

The network interface 1214 may be configured to allow data to be exchanged between the computing device 1202 and other device or devices attached to a network or networks, such as other computer systems or devices, for example. In various aspects, the network interface 1214 may support communication via any suitable wired or wireless general data networks, such as types of Ethernet networks, for example. Additionally, the network interface 1214 may support communication via telecommunications/telephony networks, such as analog voice networks or digital fiber communications networks, via storage area networks, such as Fibre Channel SANs (storage area networks), or via any other suitable type of network and/or protocol.

In one aspect, the central BUS 1206 may be configured to coordinate I/O traffic between the processor(s) 1204, the memory 1208, the network interface 1214, and any peripherals 1218 which may include, for example, the actuators of the actuator system 301, the throttle 346, and the manual brake actuator 344 which may transmit data and receive instructions from the I/O interface 1216. Additionally, the I/O interface 1216 is provided for inputting signals and/or data from sensors 1230, which may include the sensor that monitors the motion of the machine 100, the sensor that detects the roll angle, a sensor that detects a speed of the machine 100, and the sensor 338 which detects the position of the body 120.

In some aspects, the central BUS 1206 may perform any necessary protocol, timing or other data transformations to convert data signals from one component (e.g., the memory 1208) into a format suitable for use by another component (e.g., the processor 1204). In some aspects, the central BUS 1206 may include support for devices attached through various types of peripheral buses, such as a variant of the Peripheral Component Interconnect (PCI) bus standard or the Universal Serial Bus (USB) standard, for example. In some aspects, the function of the central BUS 1206 may be split into two or more separate components, such as a north bridge and a south bridge, for example. Also, in some aspects some or all of the functionality of the central BUS 1206, such as an interface to the memory 1208, may be incorporated directly into the processor 1204.

It should also be appreciated that the systems in the figures are merely illustrative and that other implementations might be used. Additionally, it should be appreciated that the functionality disclosed herein might be implemented in software, hardware, or a combination of software and hardware. Other implementations should be apparent to those skilled in the art.

Each of the operations, processes, methods, and algorithms described in the preceding sections may be embodied in, and fully or partially automated by, code modules executed by at least one computer or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any in any type of non-transitory computer storage such as, e.g., volatile or non-volatile storage.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

We claim:

1. A method for implementing and canceling an automatic operation of a body of a machine, the method comprising:
   receiving, via one or more processors, a selection of an automatic setting,
      the automatic setting corresponding to a first operation of a hoist mode actuator of the machine;
   determining, via the one or more processors, an activation state of the automatic setting;

causing, via the one or more processors, an automatic operation of an engine of the machine to adjust an idle level of the engine to a first idle level based on determining that the automatic setting is activated;

causing, via the one or more processors, an automatic operation of a hoist system of the body to move the body in a first direction to a first position based on a force associated with the first idle level of the engine and a direction of the first operation of the hoist mode actuator based on determining that the automatic setting is activated;

canceling, via the one or more processors, the automatic operation of the engine based on a second operation of the hoist mode actuator and controlling the idle level of the engine according to operations of a throttle of the machine; and canceling, via the one or more processors, the automatic operation of the hoist system based on the second operation of the hoist mode actuator and controlling the hoist system to move the body according to the idle level of the engine and respective directions of the second operation the hoist mode actuator and subsequent operations of the hoist mode actuator.

2. The method of claim 1,
wherein the automatic operation of the engine includes:
determining, via the one or more processors, whether a current position of the body is within a predetermined range of the first position, and
causing an adjustment of the idle level of the engine from the first idle level to a second idle level.

3. The method of claim 2,
wherein the automatic operation of the hoist system includes moving the body based on a force associated with the second idle level of the engine for a range of movement between the current position and the first position, and
wherein the first idle level is greater than the second idle level.

4. The method of claim 1,
wherein the automatic operation of the hoist system includes:
detecting, via one or more sensors, a position of the body,
receiving, via the one or more processors, the position of the body from the one or more sensors, and
determining, via the one or more processors, whether the position of the body is equal to the first position and operating the hoist system to hold the body in the first position.

5. The method of claim 1, further comprising:
detecting, via one or more sensors, a direction of movement of the body during the automatic operation of the hoist system;
determining, via the one or more processors, the direction of movement of the body does not correspond to the first operation of the hoist mode actuator; and
canceling the automatic operation of the engine and the automatic operation of the hoist system.

6. The method of claim 1, further comprising causing a brake system of the machine to actuate brake devices to apply braking forces to respective wheels of the machine based on the first operation of the hoist mode actuator, prior to the automatic operation of the engine.

7. The method of claim 6, further comprising:
cancelling, via the one or more processors, an automatic operation of the brake system based on an operation of a manual brake actuator and an operation of an automatic brake actuator; and causing, via the one or more processors, the automatic operation of the engine and the automatic operation of the hoist system to continue.

8. The method of claim 7, further comprising causing, via the one or more processors, an automatic operation of a transmission to adjust to a neutral transmission range based on the first operation of the hoist mode actuator, prior to the automatic operation of the engine.

9. The method of claim 8, further comprising:
determining, via the one or more processors, an adjustment of the transmission based on the automatic operation of the transmission does not correspond to the first operation of the hoist mode actuator;
canceling, via the one or more processors, the automatic operation of each of the transmission, the brake system, the engine, and the hoist system; and
controlling:
the transmission to adjust a transmission range of the transmission based on operatons of a transmission range actuator,
the brake devices of the brake system based on operations of the manual brake actuator,
the idle level of the engine based on operations of the throttle of the machine, and
the hoist system to move the body based on the idle level of the engine and respective directions of operations of the hoist mode actuator.

10. A method for implementing and canceling an automatic operation of a body of a machine, the method comprising:
receiving, via one or more processors, a selection of an automatic setting,
the automatic setting corresponding to a first operation of a hoist mode actuator of the machine;
determining, via the one or more processors, an activation state of the automatic setting;
causing, via the one or more processors, an automatic operation of an engine of the machine to adjust an idle level of the engine to a first idle level based on determining the automatic setting is activated;
causing, via the one or more processors, an automatic operation of a hoist system of the body to move the body in a first direction to a first position based on a force associated with the first idle level of the engine and a direction of the first operation of the hoist mode actuator based on determining that the automatic setting is activated;
canceling, via the one or more processors, the automatic operation of the engine based on an operation of a throttle of the machine and controlling the idle level of the engine based on the operation throttle and subsequent operations of the throttle; and
causing, via the one or more processors, the hoist system to continue to a movement of the body based on the automatic operation of the hoist system.

11. The method of claim 10,
wherein the automatic operation of the engine includes:
determining, via the one or more processors, whether a current position of the body is within a predetermined range of the first position, and
causing an adjustment of the idle level of the engine from the first idle level to a second idle level.

12. The method of claim 11, wherein the automatic operation of the hoist system includes moving the body based on a force associated with the second idle level of the engine for a range of movement between the current position and the first position, and wherein the first idle level is greater than the second idle level.

13. The method of claim 10, further comprising:
   detecting, via one or more sensors, a direction of movement of the body during the automatic operation of the hoist system of the body;
   determining, via the one or more processors, that the direction of movement of the body does not correspond to the first operation of the hoist mode actuator; and
   canceling the automatic operation of the engine and the automatic operation of the hoist system.

14. The method of claim 10, further comprising causing, via the one or more processors, a brake system of the machine to actuate brake devices to apply braking forces to respective wheels of the machine based on the first operation of the hoist mode actuator, prior to the automatic operation of the engine.

15. The method of claim 14, further comprising:
   cancelling the automatic operation of the brake system based on an operation of a manual brake actuator and an operation of an automatic brake actuator; and
   causing the automatic operation of the engine and the automatic operation of the hoist system to continue.

16. The method of claim 15, further comprising causing, via the one or more processors, an automatic operation of a transmission to adjust to a neutral transmission range based on the first operation of the hoist mode actuator, prior to the automatic operation of the engine.

17. The method of claim 16, further comprising:
   determining, with the one or more processors, that an adjustment of the transmission does not correspond to the first operation of the hoist mode actuator;
   canceling the automatic operation of each of the transmission, the brake system, the engine, and the hoist system; and
   controlling:
      the transmission to adjust a transmission range of the transmission based on operations of a transmission range actuator,
      the brake devices of the brake system based on operations of the manual brake actuator,
      the idle level of the engine based on operations of the throttle of the machine, and
      the hoist system to move the body based on the idle level of the engine and based on respective directions of operations of the hoist mode actuator.

18. A machine comprising:
   a frame;
   a cab mounted on the frame and configured to accommodate a user;
   an engine mounted on the frame;
   a body attached to the frame configured to move relative to the machine between a fully raised position and a fully lowered position;
   a hoist system configured to transmit a force of the engine to move the body;
   a hoist mode actuator in the cab configured to actuate the hoist system to move the body, and
   a controller connected to the hoist mode actuator, the hoist system, and the engine,
   wherein the hoist mode actuator is operated in a first operation, and
   wherein the controller controls an automatic operation of the engine to increase an idle level of the engine and an automatic operation of the hoist system to transmit a force corresponding to the idle level of the engine and move the body in a continuous movement to one of the fully raised position and the fully lowered position,
   wherein the hoist mode actuator is operated in a second operation and wherein the controller cancels the automatic operation of the engine based on the second operation and controls the idle level of the engine based on operations of a throttle of the machine, and
   wherein the controller cancels the automatic operation of the hoist system based on the second operation and controls the hoist system based on the second operation of the hoist mode actuator and subsequent operations of the hoist mode actuator.

19. The machine of claim 18, further comprising a transmission range actuator configured to actuate a transmission of the machine to be in any one of a plurality of transmission ranges,
   wherein the transmission range actuator includes:
      a base,
      a grip extending from a first end of the base, and
      a first housing extending from a second end of the base and including a first wall and a second wall,
      wherein the hoist mode actuator is positioned between the first wall and the second wall of the first housing and configured to move relative to the transmission range actuator.

20. The machine of claim 19, further comprising:
   a plurality of wheels supporting the frame; and
   a brake system connected to the controller and including:
      a brake device positioned on each wheel of at least a portion of the plurality of wheels,
      a manual brake actuator positioned in the cab, and
      an automatic brake actuator extending from the grip of the transmission range actuator,
      wherein the automatic brake actuator is operated during an operation of the manual brake actuator and wherein the controller operates the brake devices to apply respective brake forces after the operation of the manual brake actuator is complete.

* * * * *